US012374289B2

(12) United States Patent
Jung

(10) Patent No.: US 12,374,289 B2
(45) Date of Patent: Jul. 29, 2025

(54) DRIVING CIRCUIT, DISPLAY DEVICE INCLUDING THE SAME, AND METHOD OF DRIVING THE SAME

(71) Applicant: Samsung Display Co., LTD., Yongin-si (KR)

(72) Inventor: Ha Yong Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/513,907

(22) Filed: Nov. 20, 2023

(65) Prior Publication Data

US 2024/0355280 A1 Oct. 24, 2024

(30) Foreign Application Priority Data

Apr. 18, 2023 (KR) ........................ 10-2023-0051019

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/0295* (2013.01); *G09G 2320/045* (2013.01)

(58) Field of Classification Search
CPC ........... H10K 59/00–95; G09G 3/3233; G09G 2300/0819; G09G 2330/028; G09G 2320/041; G09G 2310/0291; G09G 3/32; G09G 2310/027; G09G 2320/0295; G09G 3/3291; G09G 2310/0278; G09G 3/30; G09G 2320/0693; G09G 2320/045; G09G 2320/0233; G09G 2300/0842; G09G 2320/0626; G09G 3/3208; G09G 3/3258; G09G 3/3275
See application file for complete search history.

(56) References Cited

U.S. PATENT DOCUMENTS

2022/0189416 A1* 6/2022 Jung ...................... G09G 3/006
2022/0262295 A1* 8/2022 Kim ..................... G09G 3/2007
2023/0317001 A1 10/2023 Jung et al.

FOREIGN PATENT DOCUMENTS

KR 10-2476467 12/2022
KR 20220162230 A * 12/2022 ........... G09G 3/3291
KR 10-2023-0143252 10/2023

* cited by examiner

*Primary Examiner* — Sanjiv D. Patel
(74) *Attorney, Agent, or Firm* — KILE PARK REED & HOUTTEMAN PLLC

(57) ABSTRACT

A driving circuit includes a sensing component including a sensing channel shared by a first sub-sensing line connected to a first pixel and a second sub-sensing line connected to a second pixel, and a timing controller that converts input data supplied from an external device in response to sensing data supplied from the sensing component, and generates output data. The sensing component further includes a sampling line that receives a first sensing voltage from the first sub-sensing line and a second sensing voltage from the second sub-sensing line, and a sampling switch connected between the sampling line and the first and second sub-sensing lines. The sampling switch is turned on during a first time the first sensing voltage is supplied to the sampling line, and is turned on during a second time different from the first time the second sensing voltage is supplied to the sampling line.

20 Claims, 24 Drawing Sheets

DRIVING CIRCUIT, DISPLAY DEVICE INCLUDING THE SAME, AND METHOD OF DRIVING THE SAME

CROSS REFERENCE TO RELATED APPLICATION(S)

This application claims priority to and benefits of Korean Patent Application No. 10-2023-0051019 under 35 U.S.C. § 119, filed on Apr. 18, 2023, in the Korean Intellectual Property Office (KIPO), the entire contents of which are incorporated herein by reference.

BACKGROUND

1. Technical Field

Embodiments related to a driving circuit, a display device including the driving circuit, and a method of driving the display device.

2. Description of Related Art

With the development of information technology, the importance of a display device, which is a connection medium between a user and information, has been emphasized. Owing to the importance of display devices, the use of various kinds of display devices, such as a liquid crystal display device, an organic light-emitting display device, and the like, has increased.

Pixels of the display devices may degrade over time due to factors such as duration of use, display luminance, and the like. Hence, data correction (grayscale correction) may be needed. To achieve the data correction (the grayscale correction), an external compensation method has been used, where a voltage (e.g., a certain or selectable voltage) (and/or current) is supplied from the pixels, and data is corrected using the supplied voltage (and/or the supplied current).

A multiplexer may be included in a sensing component for external compensation. In case that the multiplexer is included in the sensing component, an uneven image may be displayed in the pixel component due to a difference in characteristics between initially sensed pixels and subsequently sensed pixels.

SUMMARY

The disclosure provides a drive circuit, a display device including the same, and method of driving the same, that controls a sampling time to prevent deviations in characteristics between pixels sensed during a second sensing period within a sensing period that includes a first sensing period and the second sensing period.

According to an embodiment of the disclosure, a driving circuit may include a sensing component including a sensing channel shared by a first sub-sensing line electrically connected to a first pixel and a second sub-sensing line electrically connected to a second pixel, and a timing controller that converts input data supplied from an external device in response to sensing data supplied from the sensing component, and generates output data. The sensing component may further include a sampling line that sequentially receives a first sensing voltage from the first sub-sensing line and a second sensing voltage from the second sub-sensing line, and a sampling switch electrically connected between the sampling line and the first and the second sub-sensing lines. The sampling switch may be turned on during a first time the first sensing voltage is supplied to the sampling line, and may be turned on during a second time different from the first time the second sensing voltage is supplied to the sampling line.

In an embodiment, the first pixel and the second pixel may be positioned on an identical pixel row.

In an embodiment, the sensing component may further include a multiplexer electrically connected to the sampling line, an analog-digital converter that generates first sensing data using the first sensing voltage supplied through the multiplexer, and generates second sensing data using the second sensing voltage supplied via the multiplexer, a first storage that stores sampling data including information about a turn-on time of the sampling switch corresponding to the second time, a sensing circuit that controls the turn-on time of the sampling switch according to the sampling data, a second storage that stores the first sensing data, and a third storage that stores the second sensing data. The first sensing data and the second sensing data may be supplied to the timing controller.

In an embodiment, the first storage may further store a minimum offset value and a maximum offset value corresponding to a range of an offset of the second sensing data corresponding to the first sensing data. The turn-on time of the sampling switch in the sampling data may be set to position the offset between the minimum offset value and the maximum offset value.

In an embodiment, the offset may be set to a value obtained by subtracting the second sensing data from the first sensing data.

In an embodiment, the sensing circuit may reset the turn-on time of the sampling switch on a cycle to position the offset between the minimum offset value and the maximum offset value.

In an embodiment, the sensing channel may include a first channel switch that is electrically connected between the first sub-sensing line and the sampling switch, and turned on during a first sensing period in a sensing period, a second channel switch that is electrically connected between the second sub-sensing line and the sampling switch, and turned on during a second sensing period in the sensing period, a first sensing capacitor that is electrically connected to the first sub-sensing line, and stores the first sensing voltage, a second sensing capacitor that is electrically connected to the second sub-sensing line, and stores the second sensing voltage, a first capacitor electrically connected between the sampling switch and the sampling line, and a second capacitor electrically connected between a first initialization component that supplies an initialization power voltage and a reference line.

In an embodiment, the sensing channel may further include a first switch electrically connected between the sampling switch and the first initialization component, and a second initialization component that is electrically connected between the sampling line and the reference line, and supplies a reference voltage to the sampling line and the reference line.

According to an embodiment of the disclosure, a display device may include first pixels and second pixels located adjacent to each other on a pixel row in a pixel component, first sub-sensing lines electrically connected to one of the first pixels, second sub-sensing lines electrically connected to one of the second pixels, a sensing component including a plurality of sensing channels shared by one of the first sub-sensing lines and one of the second sub-sensing lines, and generating first sensing data using first sensing voltages from the first sub-sensing lines using an analog-digital converter during a first sensing period, and generating second sensing data using second sensing voltage from the second sub-sensing lines using the analog-digital converter during a second sensing period, and a timing controller that converts input data supplied from an external device using the first sensing data and the second sensing data and generates output data. Each of the plurality of sensing channels may include a sampling line electrically connected to the analog-digital converter, and a sampling switch electrically connected to the sampling line. The sampling switch may be turned on during a first time the first sensing voltage is supplied to the sampling line, and may be turned on during a second time different from the first time the second sensing voltage is supplied to the sampling line.

In an embodiment, the first pixels may be positioned on an odd-numbered pixel column, and the second pixels may be positioned on an even-numbered pixel column.

In an embodiment, the sensing component may further include a first storage that stores sampling data including information about a turn-on time of the sampling switch corresponding to the second time, and a minimum offset value and a maximum offset value corresponding to a range of an offset of the second sensing data corresponding to the first sensing data, a sensing circuit that controls the turn-on time of the sampling switch according to the sampling data, a second storage that stores the first sensing data, and a third storage that stores the second sensing data.

In an embodiment, the sensing circuit may reset the sampling data on a cycle, and the sensing circuit may store the sampling data including the turn-on time of the sampling switch in case that the offset obtained by subtracting the second sensing data from the first sensing data generated from an identical one of the plurality of sensing channels is positioned between the minimum offset value and the maximum offset value in the first storage.

In an embodiment, the sapling data may correspond to an average of the sampling data of the plurality of sensing channels.

In an embodiment, the pixel component may include a plurality of pixel rows, and the sampling data may correspond to an average of the sampling data of the plurality of sensing channels of at least two of the plurality of pixel rows.

In an embodiment, the sampling data may correspond to pieces of the sampling data corresponding to the plurality of sensing channels.

In an embodiment, the sampling switch in each of the plurality of sensing channels may be set to a turn-on state during different times by the pieces of the sampling data.

In an embodiment, the sensing component may further include a multiplexer that sequentially electrically connects each of the plurality of sensing channels to the analog-digital converter.

According to an embodiment of the disclosure, a method of driving a display device including a plurality of sensing channels electrically connected to one of first sub-sensing lines electrically connected to first pixels, and to one of second sub-sensing lines electrically connected to second pixels. The method may include turning on a sampling switch included in the plurality of sensing channels during a first sensing period in a sensing period, and supplying a first sensing voltage to a first capacitor, turning on the sampling switch during a second sensing period different from the first sensing period in response to a sampling data, and supplying a second voltage to a second capacitor, generating first sensing data using the first sensing voltage, and generating second sensing data using the second sensing voltage.

In an embodiment, the method may further include storing a minimum offset value and a maximum offset value corresponding to a characteristic deviation range between the first sensing data and the second sensing data, and storing the sampling data including a turn-on time of the sampling switch set to position an offset obtained by subtracting the second sensing data from the first sensing data between the minimum offset value and the maximum offset value.

In an embodiment, the sampling data may correspond to an average of pieces of the sampling data of the plurality of sensing channels.

The objects of the disclosure are not limited to the above-stated object, and those skilled in the art will clearly understand other not mentioned objects from the accompanying claims.

DETAILED DESCRIPTION OF THE EMBODIMENTS

Figure 1:
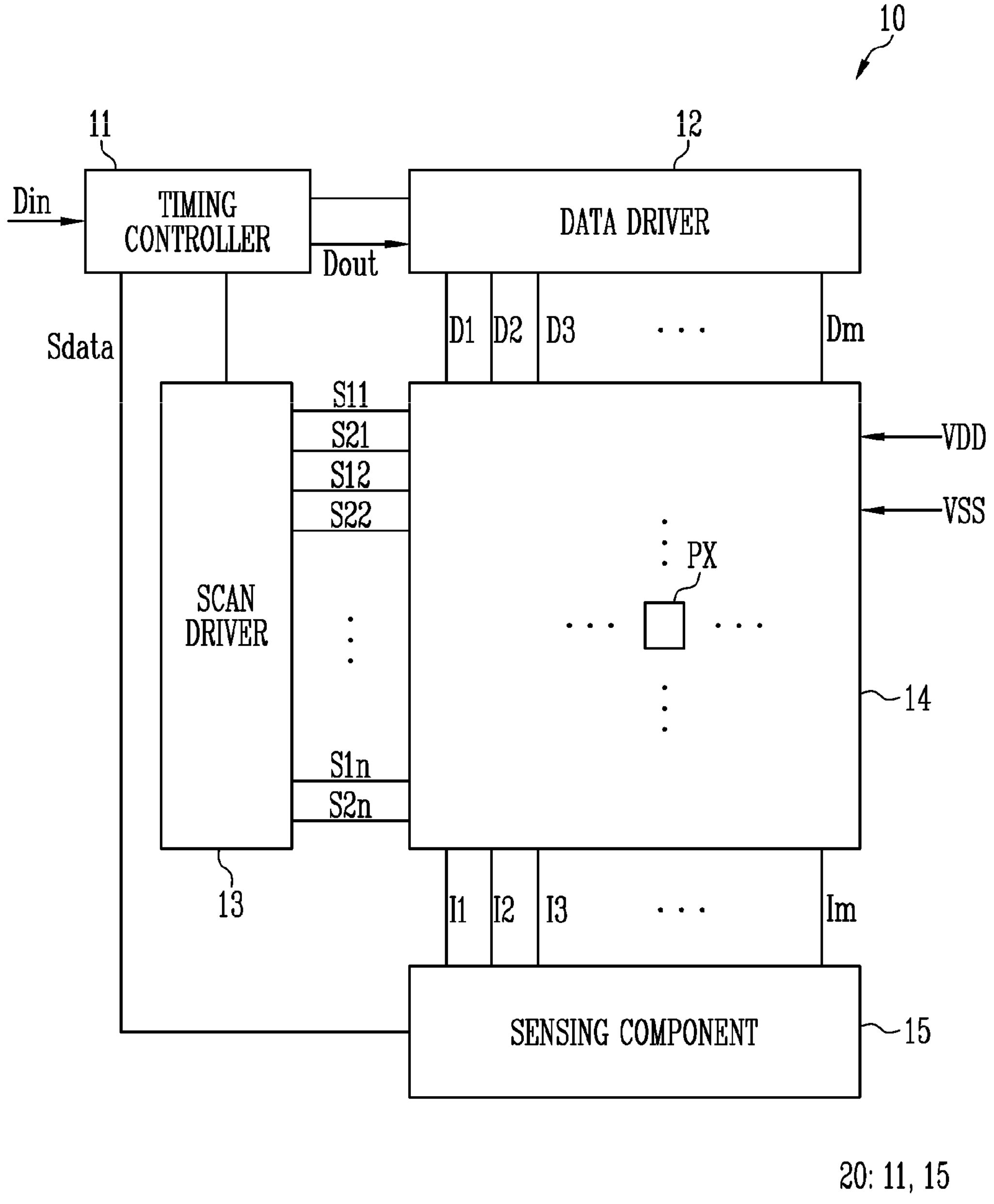
FIG. 1 is a schematic block diagram illustrating a display device in accordance with an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Hereinafter, embodiments of the disclosure will be described in detail with reference to the attached drawings, such that those skilled in the art can easily implement the disclosure. The disclosure may be implemented in various forms, and is not limited to embodiments to be described herein below.

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

In the drawings, portions which are not related to the disclosure will be omitted in order to explain the disclosure more clearly. Reference should be made to the drawings, in which similar reference numerals are used throughout the different drawings to designate similar components. Therefore, the aforementioned reference numerals may be used in other drawings.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

For reference, the size of each component and the thicknesses of lines illustrating the component are arbitrarily represented for the sake of explanation, and the disclosure is not limited to what is illustrated in the drawings. In the drawings, the thicknesses of the components may be exaggerated to clearly depict multiple layers and areas. When an embodiment may be implemented differently, a specific process order may be performed differently from the described order. For example, two consecutively described processes may be performed substantially at the same time or performed in an order opposite to the described order.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Furthermore, the expression "being the same" may mean "being substantially the same". In other words, the expression "being the same" may include a range that can be tolerated by those skilled in the art. The other expressions may also be expressions from which the term "substantially" has been omitted.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

For the purposes of this disclosure, the phrase "at least one of A and B" may be construed as A only, B only, or any combination of A and B. "At least one of X, Y, and Z," "at least two of X, Y, and Z," and "at least one selected from the group consisting of X, Y, and Z" may be construed as X only, Y only, Z only, or any combination of two or more of X, Y, and Z. Also, "at least two of X, Y, and Z," may be construed as two or more of X, Y, and Z such as both X and Y, both X and Z, both Y and Z, both X, Y, and Z.

Some embodiments are described in the accompanying drawings in connection with functional blocks, units, and/or modules. Those skilled in the art will understand that such blocks, units, and/or modules are physically implemented by logic circuits, discrete components, microprocessors, hard-wired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g., one or more programmed microprocessors and related circuits). Furthermore, in some embodiments, blocks, units, and/or modules may be physically separated into two or more individual blocks, units, and/or modules which interact with each other without departing from the scope of the disclosure. In some embodiments, blocks, units and/or modules may be physically combined into more complex blocks, units and/or modules without departing from the scope of the disclosure.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that when an element such as a layer, film, region, or substrate is referred to as being "on" or "over" another element, it can be directly on the other element or intervening element(s) may also be present. In contrast, when an element is referred to as being "directly on" another element, no intervening elements are present.

When a component is described herein to "connect" another component to the other component or to be "connected to" other components, the components may be connected to each other as separate elements, or the components may be integral with each other.

It will be understood that, although the terms "first," "second," etc. may be used herein to describe various elements, these elements should not be limited by these terms. These terms are merely used to distinguish one element from another element. For instance, a first element discussed below could be termed a second element without departing from the teachings of the disclosure.

However, the disclosure is not limited to the following embodiments and may be modified into various forms. Each embodiment to be described below may be implemented alone, or combined with at least another embodiment to make various combinations of embodiments.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic block diagram illustrating a display device 10 in accordance with an embodiment of the disclosure.

Referring to FIG. 1, the display device 10 in accordance with an embodiment of the disclosure may include a driving circuit 20, a data driver 12, a scan driver 13, and a pixel component 14. The driving circuit 20 may include a timing controller 11 and a sensing component 15.

The timing controller 11 and the sensing component 15 that are included in the driving circuit 20 may be integrated into one integrated circuit (hereinafter, referred to as IC). In another embodiment, the timing controller 11, the data driver 12, and the sensing component 15 may be integrated into one IC. According to another embodiment, the timing controller 11, the data driver 12, and the sensing component 15 may be integrated in multiple ICs.

The timing controller 11 may receive, from an external process, input data Din and control signals that correspond to each frame. The external processor may include at least one of a graphics processing unit (GPU), a central processing unit (CPU), an application processor (AP), or the like.

The timing controller 11 may convert the input data Din and generate output data Dout, and supply the generated output data Dout to the data driver 12. The timing controller 11 may convert the input data Din in response to sensing data Sdata supplied from the sensing component 15, and generate the output data Dout. The input data Din may be converted in response to a threshold voltage and/or mobility of a driving transistor included in the pixel PX. The timing controller 11 may convert the input data Din in response to a light measurement result of the pixel component 14 measured during a manufacturing process. In an embodiment, the timing controller 11 may convert the input data Din using various methods, and generate the output data Dout.

The timing controller 11 may provide control signals corresponding to the data driver 12, the scan driver 13, and the sensing component 15.

During a display period, the data driver 12 may generate, using the output data Dout and the control signals that are provided from the timing controller 11, data signals (or data voltages) and supply to the data lines D1 to Dm (where "m" is a natural number). The data driver 12 may supply data signals to the data lines D1 to Dm on a pixel row basis (or a horizontal line basis). The term "pixel row" may refer to a horizontal line on which the pixels PX that are connected to a same scan line are located.

During a sensing period, the data driver 12 may supply a voltage (e.g., a certain or selectable voltage) to the data lines D1 to Dm. The voltage may be set to turn on the driving transistors included in each of the pixels PX.

In response to the control signals supplied from the timing controller 11, the scan driver 13 may supply first scan signals to first scan lines S11 to Sin (where "n" is a natural number), and supply second scan signals to second scan lines S21 to S2*n*.

For example, the scan driver 13 may sequentially supply first scan signals each having a gate-on voltage (or a turn-on level) to the first scan lines S11 to S1*n*. For example, the scan driver 13 may sequentially supply second scan signals each having a gate-on voltage to the second scan lines S21 to S2*n*. Although FIG. 1 illustrates that one scan driver 13 supplies the first and second scan signals to the first scan lines S11 to Sin and the second scan lines S21 to S2*n*, the disclosure is not limited thereto. In another embodiment, the first scan lines S11 to Sin and the second scan lines S21 to S2*n* may be respectively supplied with scan signals from different scan drivers.

The sensing component 15 may be connected to sensing lines I1, I2, I3, and Im. For example, the sensing lines I1 to Im may be formed corresponding to pixel columns.

During a display period, the sensing component 15 may supply a voltage of an initialization power supply to the sensing lines I1 to Im. During a sensing period, the sensing component 15 may receive sensing voltages (or sensing currents) from the pixels PX connected to the sensing lines I1 to Im. The threshold voltage and/or mobility information of the driving transistor included in each of the pixels PX may be included in the corresponding sensing voltage. The sensing component 15 may convert an analog sensing voltage to digital sensing data Sdata, and supply the converted digital sensing data Sdata to the timing controller 11.

The sensing component 15 may include a multiplexer, and may receive a first sensing voltage sequentially from first pixels (e.g., pixels located on odd-numbered pixel columns (or vertical lines)) among the pixels PX located on a pixel row (e.g., a specific or selectable pixel row) during a first sensing period, and may receive a second sensing voltage sequentially from second pixels (e.g., pixels located on even-numbered pixel columns) among the pixels PX located on the pixel row during a second sensing period. The term "pixel column" may refer to a vertical line on which the pixels PX that are connected to a same data line are located.

In an embodiment, a first sampling time (or a turn-on time of a sampling switch) at which the first pixels are sensed may be fixed by the driving circuit 20, and a second sampling time at which the second pixels are sensed may be reset on a cycle (or with a regular interval). The second sampling time of the second pixel and the first sampling time of the first pixel disposed adjacent to the second pixel may be set to be substantially the same.

In an embodiment, the first sampling time may be set to a first time. The second sampling time may be set to a second time. The second time and the first time may be different from each other. The term "sampling time" may refer to a duration during which a sensing voltage stored in a sensing capacitor Cso or Cse (see, e.g., FIG. 4) is supplied to a first capacitor C1 (see, e.g., FIG. 4).

The pixel component 14 may include pixels PX. The pixels PX may receive data signals and display an image. Each pixel PX may be connected to a corresponding data line (one of D1 to Dm), corresponding scan lines (one of S11 to Sin and one of S21 to S2*n*), and a corresponding sensing line (one of I1 to Im). The pixels PX may be supplied with a voltage between a first power supply VDD and a second power supply VSS from an external device. In an embodiment, the first power supply VDD may provide a higher voltage than the second power supply VSS.

Figure 2:
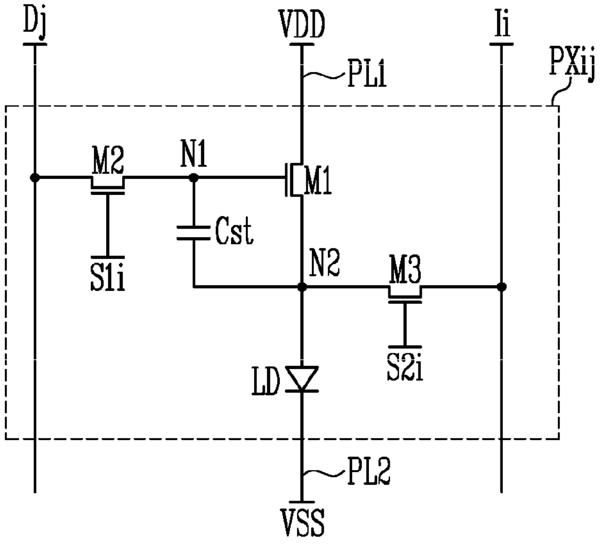
FIG. 2 is a schematic diagram of an equivalent circuit of a pixel in accordance with an embodiment of the disclosure.

FIG. 2 is a schematic diagram of an equivalent circuit of a pixel Pxij in accordance with an embodiment of the disclosure. FIG. 2 illustrates a pixel Pxij located on an i-th horizontal line and a j-th vertical line (where "i" and "j" are natural numbers).

Referring to FIG. 2, the pixel Pxij in accordance with an embodiment of the disclosure may include transistors M1 to M3, a storage capacitor Cst, and a light emitting element LD.

The light emitting element LD may be connected between a first power line PL1 to which the first power supply VDD is supplied, and a second power line PL2 to which the second power supply VSS is supplied. For example, a first electrode (e.g., an anode electrode) of the light emitting element LD may be connected to the first power line PL1 through a second node N2 and the first transistor M1. A second electrode (e.g., a cathode electrode) of the light emitting element LD may be connected to the second power line PL2. The light emitting element LD may emit light at a luminance corresponding to driving current supplied from the first transistor M1.

The voltage of the first power supply VDD and the voltage of the second power supply VSS may have difference potentials, to emit light by the light emitting element LD. For example, the first power supply VDD may be a high-potential power supply having a high voltage. The second power supply VSS may be a low-potential power supply having a low voltage.

For example, the light emitting element LD may be an organic light emitting diode. However, the disclosure is not limited thereto, and the light emitting element LD may be an inorganic light emitting diode such as a micro light emitting diode (LED), a quantum dot light emitting diode, or the like. The light emitting element LD may be an element formed of a combination of organic material and inorganic material. FIG. 2 illustrates that the pixel Pxij includes a single light emitting element LD. In another embodiment, the pixel Pxij may include multiple light emitting elements, and the light emitting elements may be connected in series, parallel, or series-parallel to each other.

Each of the transistors M1, M2, and M3 may be formed of an N-type transistor. In another embodiment, each of the transistors M1, M2, and M3 may be formed of a P-type transistor. In another embodiment, the transistors M1, M2, and M3 may be formed of one of N-type transistors and P-type transistors. Each transistor M1, M2, or M3 may be configured in various forms such as a thin film transistor (TFT), a field effect transistor (FET), a bipolar junction transistor (BJT), and the like.

The first transistor M1 (or a driving transistor) may be connected between the first power line PL1 and the second node N2. A gate electrode of the first transistor M1 may be connected to a first node N1. The first transistor M1 may control, in response to a voltage of the first node N1, an amount of current flowing from the first power supply VDD to the second power supply VSS through the light emitting element LD. The first transistor M1 may be a driving transistor.

The second transistor M2 may be connected between a data line Dj and the first node N1. A gate electrode of the second transistor M2 may be connected to the first scan line S1*i*. In case that a first scan signal is supplied to the first scan line S1*i*, the second transistor M2 may be turned on and electrically connect the data line Dj to the first node N1. The second transistor M2 may be a switching transistor.

The third transistor M3 may be connected between the second node N2 and a sensing line Ii. A gate electrode of the third transistor M3 may be connected to the second scan line S2*i*. In case that a second scan signal is supplied to the second scan line S2*i*, the third transistor M3 may be turned on and electrically connect the sensing line Ii to the second node N2.

The storage capacitor Cst may be connected between the first node N1 and the second node N2. The storage capacitor Cst may store a voltage corresponding to a difference in voltage between the first node N1 and the second node N2.

Figure 3:
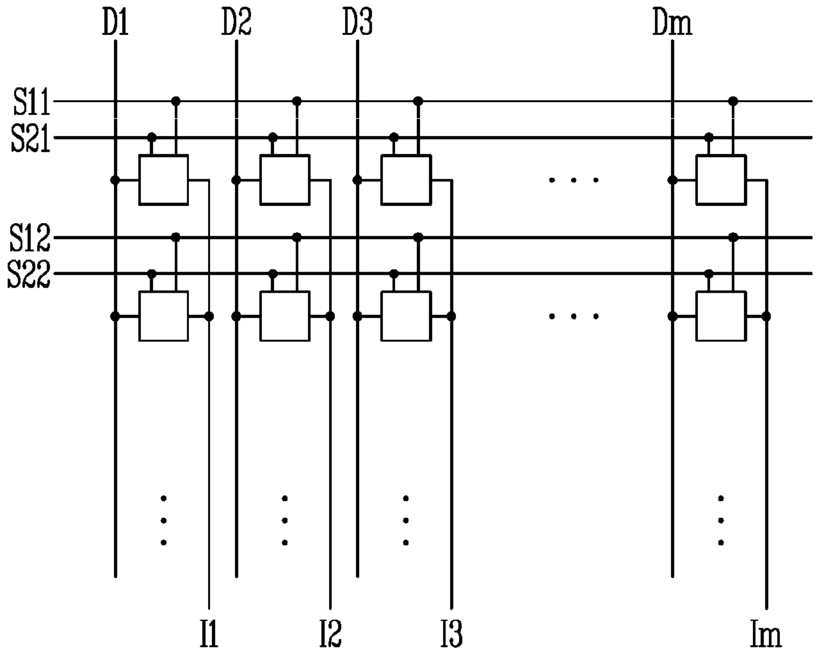
FIG. 3 is a schematic diagram of sensing lines of FIG. 1 according to an embodiment.

FIG. 3 is a schematic diagram of the sensing lines I1 to Im of FIG. 1 according to an embodiment.

Referring to FIG. 3, the sensing lines I1 to Im may be disposed corresponding to pixel columns. Each of the sensing lines I1 to Im may be electrically connected to the pixels PX that are located on the corresponding pixel column.

For example, the first sensing line I1 may be electrically connected to the pixels PX that are located on the first pixel column. The pixels PX located on the first pixel column may be electrically connected to the first data line D1.

In an embodiment, among the sensing lines I1 to Im, the sensing lines located on adjacent pixel columns may share a single sensing channel. For example, the first sensing line I1 and the second sensing line I2 may share a single sensing channel. For example, each of the sensing lines I1, I3 located on the odd-numbered pixel columns may share a sensing channel with a sensing line I2 located on a corresponding even-numbered pixel.

Hereinafter, for convenience of explanation, an odd-numbered sensing line that share the sensing channel will be referred to as a first sub-sensing line, and an even-numbered sensing line will be referred to as a second sub-sensing line. Furthermore, a pixel connected to the first sub-sensing line will be referred to as a first pixel, and a pixel connected to the second sub-sensing line will be referred to as a second pixel.

Figure 4:
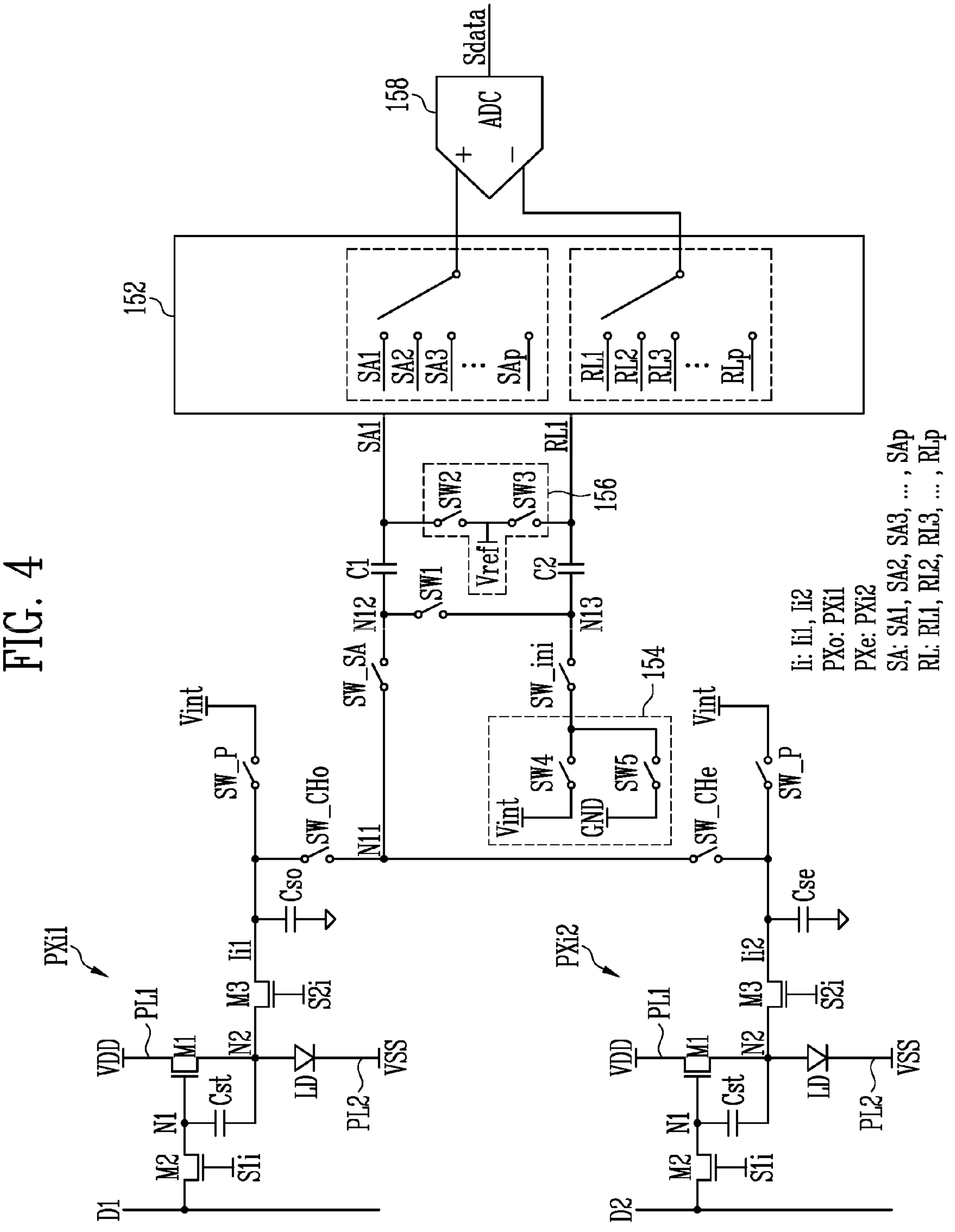
FIG. 4 is a schematic diagram of an equivalent circuit of a sensing channel of a sensing component in accordance with an embodiment of the disclosure.

FIG. 4 is a schematic diagram of an equivalent circuit of a sensing channel of the sensing component 15 (see, e.g., FIG. 1) in accordance with an embodiment of the disclosure. FIG. 4 illustrates a sensing channel connected to a first sub-sensing line Ii1 and a second sub-sensing line Ii2 that are located on an i-th pixel row. A sensing line Ii may include the first sub-sensing line Ii1 and the second sub-sensing line Ii2. The first sub-sensing line Ii1 may be electrically connected to a first pixel Pxi1 connected to a first data line D1 (or arranged in an odd-numbered pixel column). The second sub-sensing line Ii2 may be electrically connected to a second pixel Pxi2 connected to a second data line D2 (or arranged in an even-numbered pixel column).

Referring to FIG. 4, the sensing channel in accordance with an embodiment of the disclosure may include a panel switch SW_P connected between each of the sub-sensing lines Ii1 and Ii2 and the initialization power supply Vint. The panel switch SW_P may remain turned on during a display period.

The sensing channel in accordance with an embodiment of the disclosure may include a first sensing capacitor Cso connected between the first sub-sensing line Ii1 and a base potential supply GND, and a second sensing capacitor Cse connected between the second sub-sensing line Ii2 and the base potential supply. The first sensing capacitor Cso may store a sensing voltage supplied from the first pixel Pxi1. The second sensing capacitor Cse may store a sensing voltage supplied from the second pixel Pxi2.

The sensing channel in accordance with an embodiment of the disclosure may include a first channel switch SW_Cho connected between the first sub-sensing line Ii1 and an eleventh node N11, and a second channel switch SW_Che connected between the second sub-sensing line Ii2 and the eleventh node N11. The first channel switch SW_Cho may be connected between the first sub-sensing line Ii1 and a sampling switch SW_SA. The first channel switch SW_Cho may remain turned on during the first pixels Pxo (e.g., the first pixel Pxi1) are sensed.

The second channel switch SW_Che may be connected between the second sub-sensing line Ii2 and the sampling switch SW_SA. The second channel switch SW_Che may remain turned on during the second pixels Pxe (e.g., the second pixel Pxi2) are sensed.

The sensing channel in accordance with an embodiment of the disclosure may include the sampling switch SW_SA connected between the eleventh node N11 and a twelfth node N12, a first capacitor C1 connected between the twelfth node N12 and a sampling line SA1, a first switch SW1 between the twelfth node N12 and a thirteenth node N13, a second capacitor C2 connected between the thirteenth node N13 and a reference line RL1, an initialization switch SW_ini connected between a first initialization component 154 and the thirteenth node N13, and a second initialization component 156 connected between the sampling line SA1 and the reference line RL1.

The sampling switch SW_SA may be turned on during the first sensing period and the second sensing period. In response to a turn-on time of the sampling switch SW_SA, a sampling time in which a sensing voltage is supplied from the first sensing capacitor Cso or the second sensing capacitor Cse to the first capacitor C1 may be controlled.

The initialization switch SW_ini may be turned on during the thirteenth node N13 is initialized. The initialization switch SW_ini may be turned on during a period (e.g., a certain or selectable period) in the first sensing period (e.g., during a period (e.g., a certain or selectable period) in a period in which the first channel switch SW_Cho is turned on) and a period (e.g., a certain or selectable period) in the second sensing period (e.g., during a period (e.g., a certain or selectable period) in a period in which the second channel switch SW_Che is turned on). The initialization switch SW_ini may be turned on during a period (e.g., a certain or selectable period) after the first channel switch SW_Cho is turned on and before the second channel switch SW_CH2 is turned on. For example, the initialization switch SW_ini may be turned on or turned off simultaneously with the sampling switch SW_SA.

The first capacitor C1 may control a voltage of the sampling line SA1 in response to a voltage of the twelfth node N12. The second capacitor C2 may control a voltage of the reference line RL1 in response to a voltage of the thirteenth node N13.

The first switch SW1 may be turned on during a period in which the twelfth node N12 and the thirteenth N13 are initialized. A turn-on period of the first switch SW1 may partially overlap a turn-on period of the sampling switch SW_SA.

The first initialization component 154 may include a fourth switch SW4 connected between the initialization power supply Vint and the initialization switch SW_ini, and a fifth switch SW5 connected between the ground potential supply GND and the initialization switch SW_ini. The fourth switch SW4 or the fifth switch SW5 may remain turned on during the sensing period. In the following description, for the sake of clarity, embodiments will be described based on that the fourth switch SW4 remains turned on during the sensing period. In an embodiment, the fifth switch SW5 may be omitted.

The second initialization component 156 may include a second switch SW2 connected between the reference power supply Vref and the sampling line SA1, and a third switch SW3 connected between the reference power supply Vref and the reference line RL1. The second switch SW2 and the third switch SW3 may be simultaneously turned on or turned off, and may be turned on during a period in which the sampling line SA1 and the reference line RL1 are initialized. A turn-on period of the second switch SW2 and the third switch SW3 may partially overlap the turn-on period of the sampling switch SW_SA. The reference power supply Vref and the initialization power supply Vint may be set to a same voltage. In the following description, for the sake of clarity, embodiments will be described based on that the reference power supply Vref and the initialization power supply Vint are set to a same voltage.

The sensing channel may be shared by the first sub-sensing line Ii1 and the second sub-sensing line Ii2 that are positioned adjacent to each other. For example, the other sensing channels that are not illustrated in FIG. 4 may also be shared by the first sub-sensing lines and the second sub-sensing lines that are positioned adjacent to each other. The other sensing channels and the sensing channel in FIG. 4 may have a same structure.

The multiplexer 152 (or a switch matrix) may be shared by multiple sensing channels. The multiplexer 152 may sequentially connect multiple sensing channels to an analog-digital converter (hereinafter, referred to as ADC) 158. For example, the multiplexer 152 may sequentially connect both one of the sampling lines SA1, SA2, SA3, and SAp included in the sensing channels (where "p" is a natural number of "m" or less) and one of the reference lines RL1, RL2, RL3, and RLp to the ADC 158.

The ADC 158 may convert a sampling voltage supplied from the sampling line SA to a digital value, based on a voltage (e.g., the voltage of the initialization power supply Vint) supplied from the reference line RL. The digital value output from the ADC 158 may be supplied to the timing controller 11 (see, e.g., FIG. 1) as sensing data Sdata.

Figure 5:
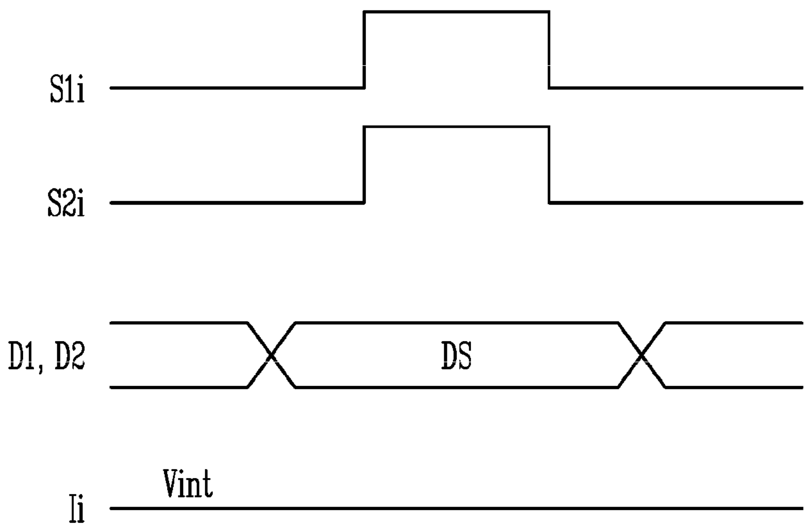
FIG. 5 is a schematic waveform diagram illustrating a driving waveform supplied during a display period in accordance with an embodiment of the disclosure.
Figure 6:
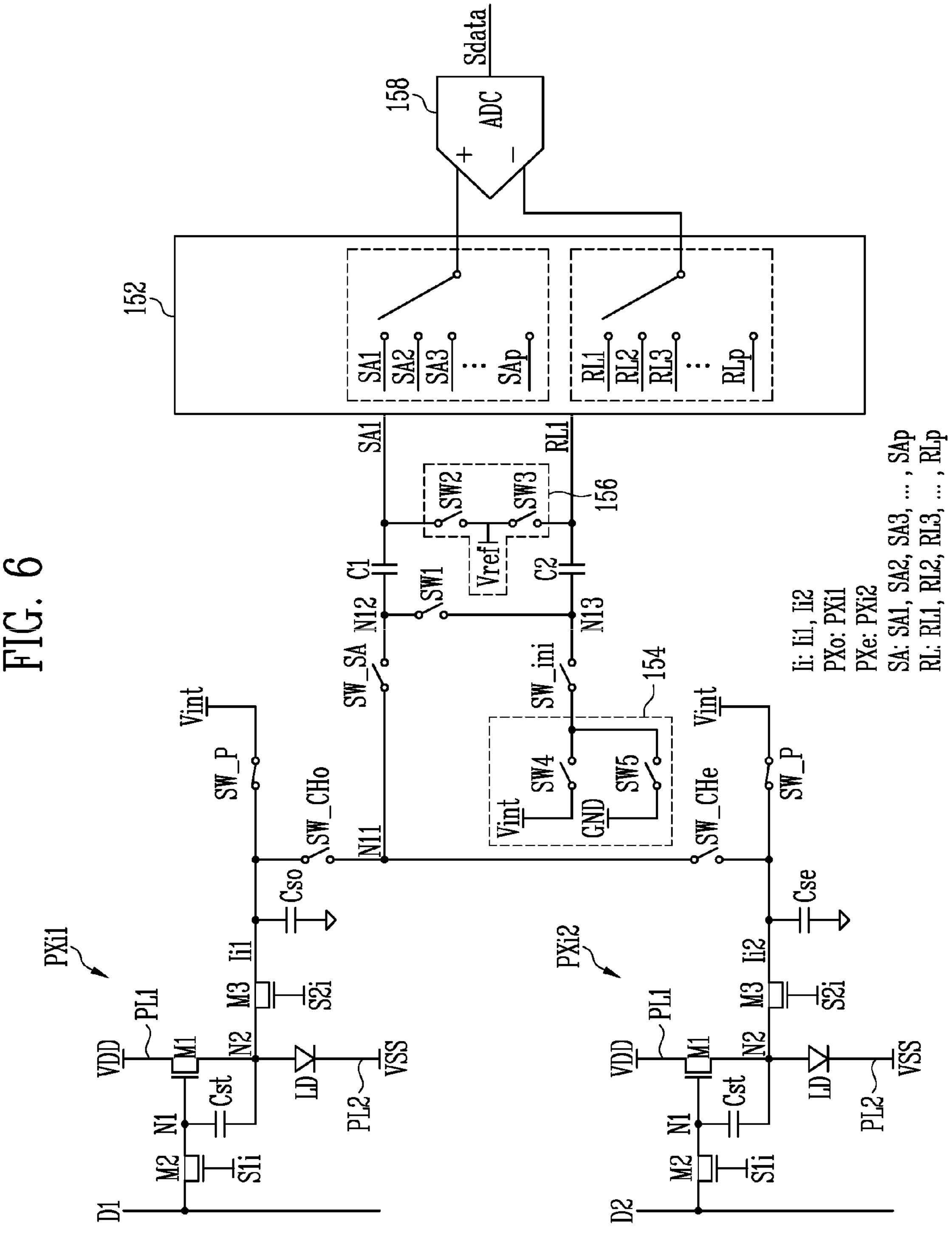
FIG. 6 is a schematic diagram illustrating an operation process of the sensing component during the display period.

FIG. 5 is a schematic waveform diagram illustrating a driving waveform supplied during a display period in accordance with an embodiment of the disclosure. FIG. 6 is a schematic diagram illustrating an operation process of the sensing component 15 (see, e.g., FIG. 1) during the display period.

Referring to FIGS. 5 and 6, the panel switch SW_P may remain turned on during the display period. In case that the panel switch SW_P is set to a turn-on state, the voltage of the initialization power supply Vint may be supplied to the sub-sensing lines Ii1 and Ii2. During the display period, the panel switches SW_P included in all of the sensing channels may be set to the turn-on state, and the sensing lines Ii may receive the voltage of the initialization power supply Vint.

During the display period, a first scan signal may be supplied to the first scan line S1*i*, and a second scan signal may be supplied to the second scan line S2*i*.

In case that the first scan signal is supplied to the first scan line S1*i*, the second transistor M2 may be turned on. In case that the second transistor M2 is turned on, data signals DS may be supplied from the data lines D1 and D2 to the first node N1. For example, a data signal may be supplied from the first data line D1 to the first pixel Pxi1, and a data signal may be supplied from the second data line D2 to the second pixel Pxi2.

In case that the second scan signal is supplied to the second scan line S2*i*, the third transistor M3 may be turned on. In case that the third transistor M3 is turned on, the voltage of the initialization power supply Vint may be supplied from the sensing lines Ii to the second node N2. A voltage corresponding to a difference between the voltage of the data signal DS and the voltage of the initialization power supply Vint may be stored in the storage capacitor Cst.

After a voltage is stored in the storage capacitor Cst, the supply of the first scan signal to the first scan line S1*i* may be interrupted and the second transistor M2 may be turned off, and the supply of the second scan signal to the second scan line S2*i* may be interrupted and the third transistor M3 may be turned off. Thereafter, the first transistor M1 may supply current corresponding to the voltage stored in the storage capacitor Cst to the light emitting element LD. A luminance of the light emitting element LD may be determined by an amount of current supplied from the first transistor M1 to the light emitting element LD.

Figure 7:
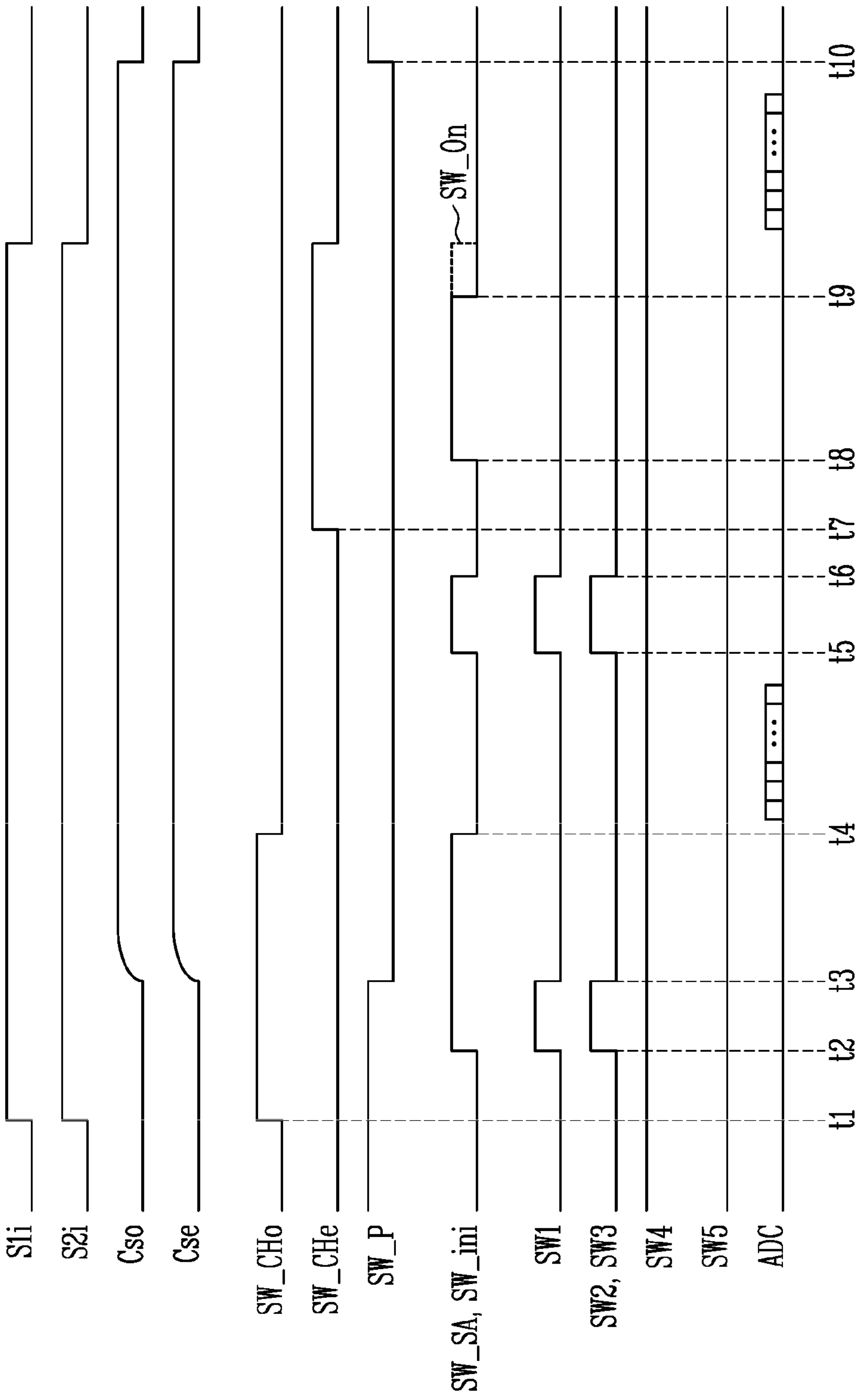
FIG. 7 is a schematic waveform diagram illustrating a driving waveform supplied during a sensing period in accordance with an embodiment of the disclosure.
Figure 8A:
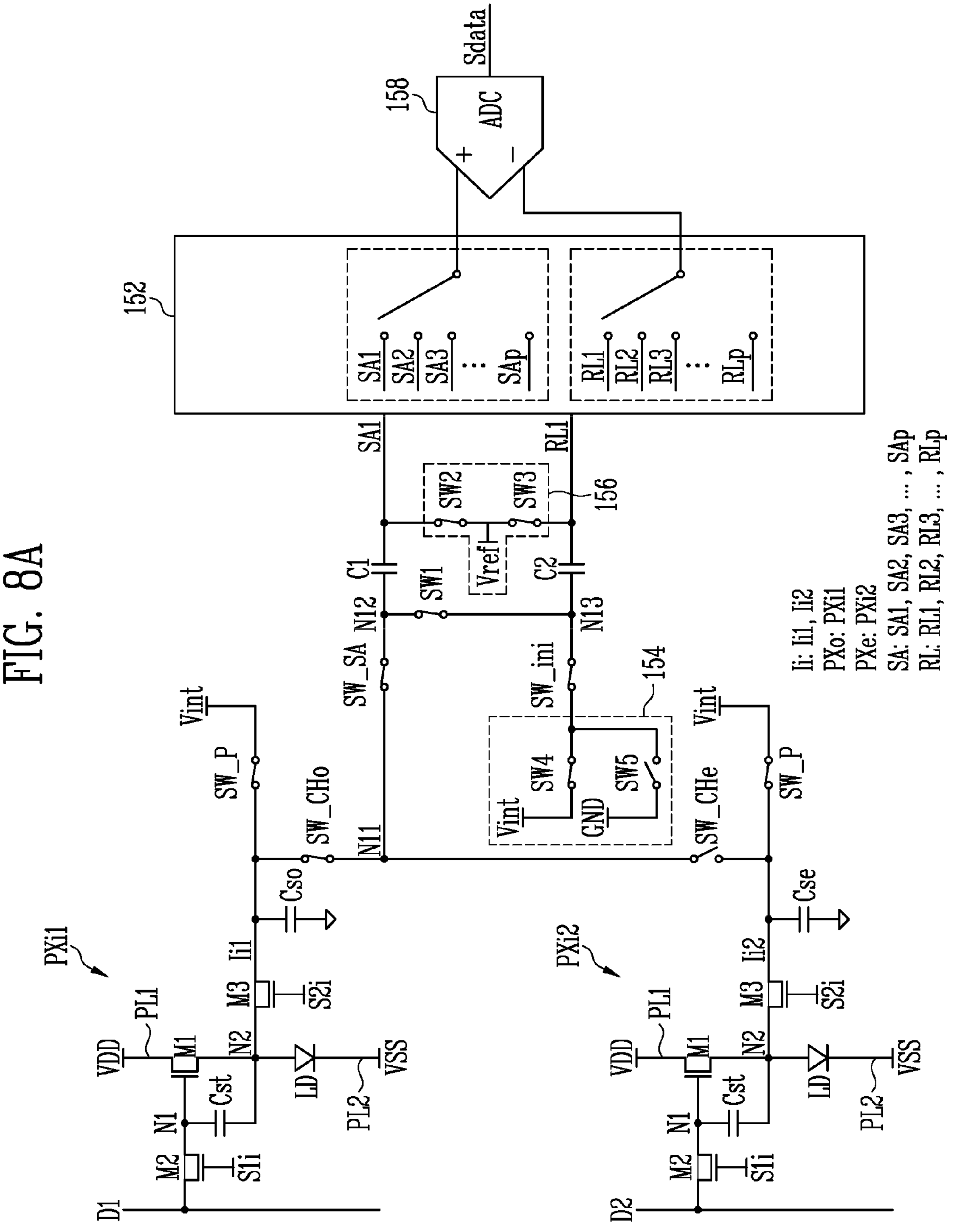
FIGS. 8A to 8C are schematic diagrams illustrating a process of generating sensing data during a first sensing period.
Figure 8B:
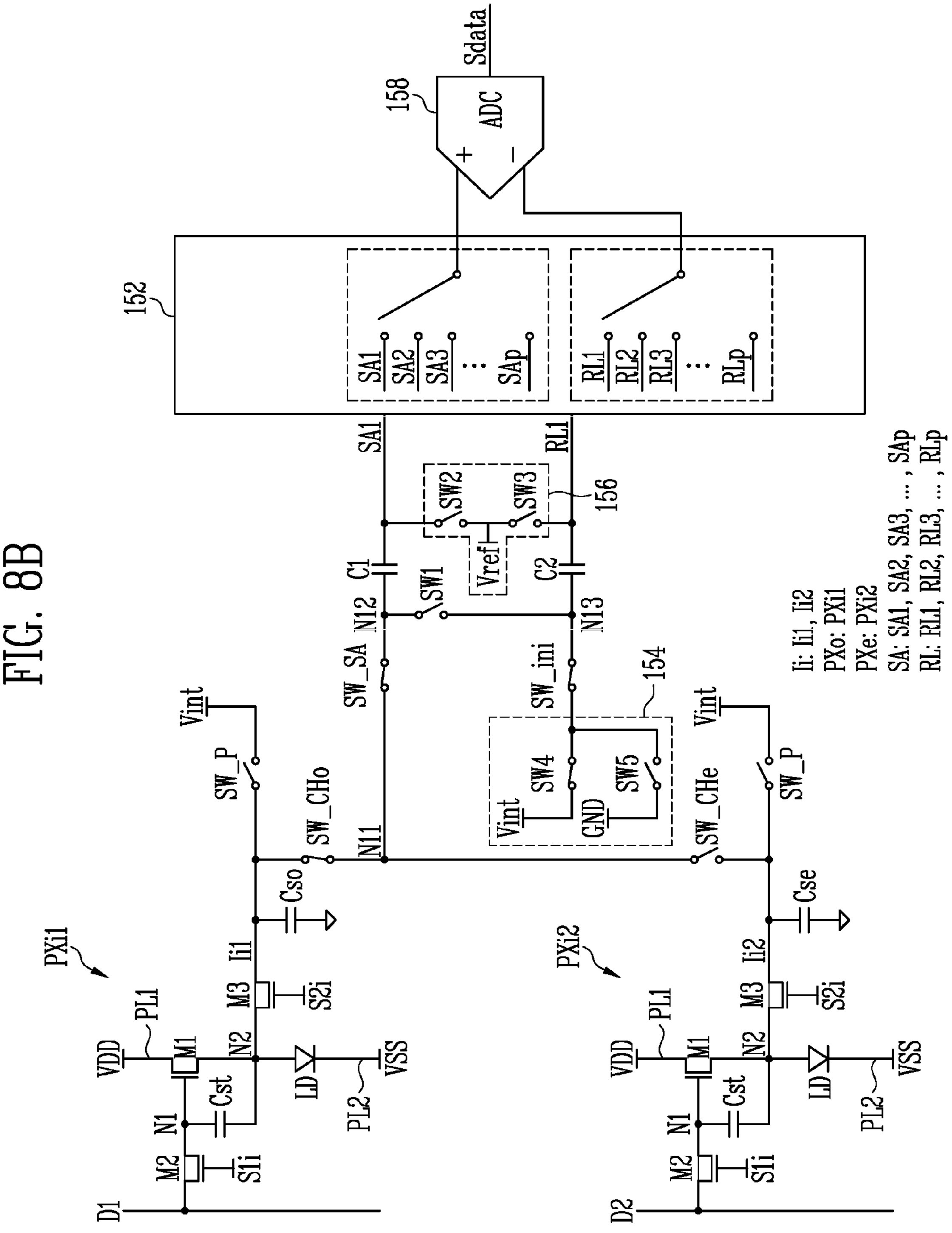
Figure 8C:
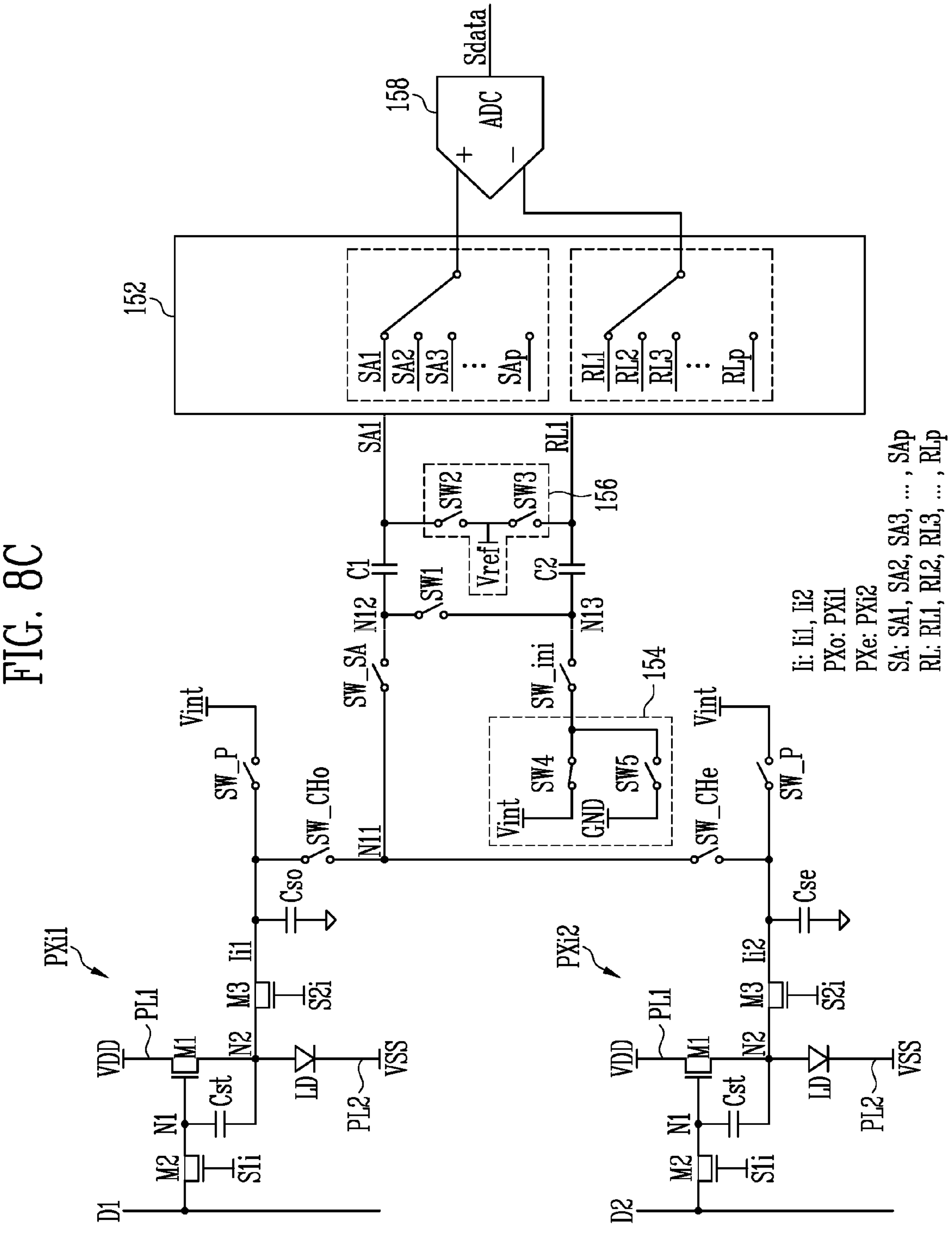

FIG. 7 is a schematic waveform diagram illustrating a driving waveform supplied during a sensing period in accordance with an embodiment of the disclosure. FIGS. 8A to 8C are schematic diagrams illustrating a process of generating sensing data during a first sensing period t1 to t5. FIGS. 9A to 9D are schematic diagrams illustrating a process of generating sensing data during a second sensing period t6 to t10. In FIG. 7, the first sensing period t1 to t5 may be a period from a first time point t1 to a fifth time point t5, and the second sensing period t6 to t10 may be a period from a sixth time point t6 to a tenth time point t10.

Referring to FIG. 7, during the sensing period, the fourth switch SW4 may remain turned on, and the fifth switch SW5 may remain turned off. In case that the fourth switch SW4 is turned on, the voltage of the initialization power supply Vint may be supplied to the initialization switch SW_ini.

During the sensing period, at the first time point t1, a first scan signal may be supplied to the first scan line S1*i*, and a second scan signal may be supplied to the second scan line S2*i*. At the first time point t1, the first channel switch SW_Cho may be turned on, and the panel switch SW_P may remain turned on.

In case that the panel switch SW_P remains turned on, the voltage of the initialization power supply Vint may be supplied to the sensing lines Ii. In case that the first scan signal is supplied to the first scan line S1*i*, the second transistor M2 may be turned on. In case that the second transistor M2 is turned on, a voltage (e.g., a certain or selectable voltage) may be supplied from the data line Dj to the first node N1. The voltage of the first node N1 may be set as a voltage that turns on the first transistor M1.

In case that the second scan signal is supplied to the second scan line S2*i*, the third transistor M3 may be turned on. In case that the third transistor M3 is turned on, the voltage of the initialization power supply Vint may be supplied from the sensing line Ii to the second node N2. A voltage corresponding to a difference between the voltage (e.g., the voltage of the first node N1) and the voltage of the initialization power supply Vint (or the voltage of the second node N2) may be stored in the storage capacitor Cst.

In case that the first channel switch SW_Cho is turned on, the voltage of the initialization power supply Vint may be supplied to the eleventh node N11.

At a second time point t2, as illustrated in FIGS. 7 and 8A, the sampling switch SW_SA, the initialization switch SW_ini, the first switch SW1, the second switch SW2, and the third switch SW3 may be turned on.

In case that the initialization switch SW_ini, the first switch SW1, and the sampling switch SW_SA are turned on, the voltage of the initialization power supply Vint may be supplied to the thirteenth node N13, the twelfth node N12, and the eleventh node N11, and the thirteenth node N13, the twelfth node N12, and the eleventh node N11 may be initialized.

In case that the second switch SW2 and the third switch SW3 are turned on, the voltage of the reference power supply Vref (or the initialization power supply Vint) may be supplied to the sampling line SA1 and the reference line RL1. The sampling line SA1 and the reference line RL1 may be initialized to the voltage of the reference power supply Vref.

The first capacitor C1 and the second capacitor C2 may be initialized by the voltage of the initialization power supply Vint and the reference power supply Vref. For example, the reference power supply Vref and the initialization power supply Vint may be set to a same voltage, and the voltage charged to the first capacitor C1 and the second capacitor C2 during the previous period may be discharged.

At a third time point t3, as illustrated in FIGS. 7 and 8B, the panel switch SW_P, the first switch SW1, the second switch SW2, and the third switch SW3 may be turned off. In case that the second switch SW2 is turned off, the voltage of the sampling line SA1 may be changed due to a coupling of the first capacitor C1.

In case that the third switch SW3 is turned off, the voltage of the reference line RL1 may be changed due to the coupling of the second capacitor C2. Because the fourth switch SW4 and the initialization switch SW_ini remain turned on, the thirteenth node N13 may be maintained at the voltage of the initialization power supply Vint. Hence, the reference line RL1 may be maintained at the voltage of the reference power supply Vref.

In case that the panel switch SW_P is turned off, a first sensing voltage corresponding to the voltage may be stored in the first sensing capacitor Cso. The threshold voltage and/or mobility information of the first transistor M1 included in the first pixel Pxi1 may be included in the first sensing voltage. For example, during a period between the third time point t3 and a fourth time point t4, the first sensing voltage may be stored in the first sensing capacitor Cso.

Likewise, in case that the panel switch SW_P is turned off, a second sensing voltage corresponding to the voltage may be stored in the second sensing capacitor Cse. The threshold voltage and/or mobility information of the first transistor M1 included in the second pixel Pxi2 may be included in the second sensing voltage. For example, during a period between the third time point t3 and the fourth time point t4, the second sensing voltage may be stored in the second sensing capacitor Cse.

Because the first channel switch SW_Cho and the sampling switch SW_SA are set to a turn-on state during a period between the third time point t3 and the fourth time point t4, the voltage of the twelfth node N12 may be increased by the first sensing voltage. In case that the voltage of the twelfth node N12 changes (or increases), the voltage of the sampling line SA1 may be changed (or increased) due to the coupling of the first capacitor C1. For example, the voltage of the sampling line SA1 may be increased by the first sensing voltage, and the threshold voltage and/or mobility information of the first transistor M1 included in the first pixel Pxi1 may be included in the voltage of the sampling line SA1.

At the fourth time point t4, as illustrated in FIGS. 7 and 8C, the first channel switch SW_Cho, the sampling switch SW_SA, and the initialization switch SW_ini may be turned off. Thereafter, during a period from the fourth time point t4 to the fifth time point t5, the multiplexer 152 may sequentially connect the sampling lines SA1 to SAp to the ADC 158, and may sequentially connect the reference lines RL1 to RLp to the ADC 158.

The ADC 158 may sequentially generate sensing data Sdata corresponding to the voltages of the sampling lines SA1 to SAp connected to the ADC 158, which represent the first sensing voltage. For example, the ADC 158 may sequentially generate sensing data Sdata corresponding to the first sensing voltage from the first pixels Pxo located on the i-th pixel row (e.g., the pixels located on the odd-numbered pixel columns).

Figure 9A:
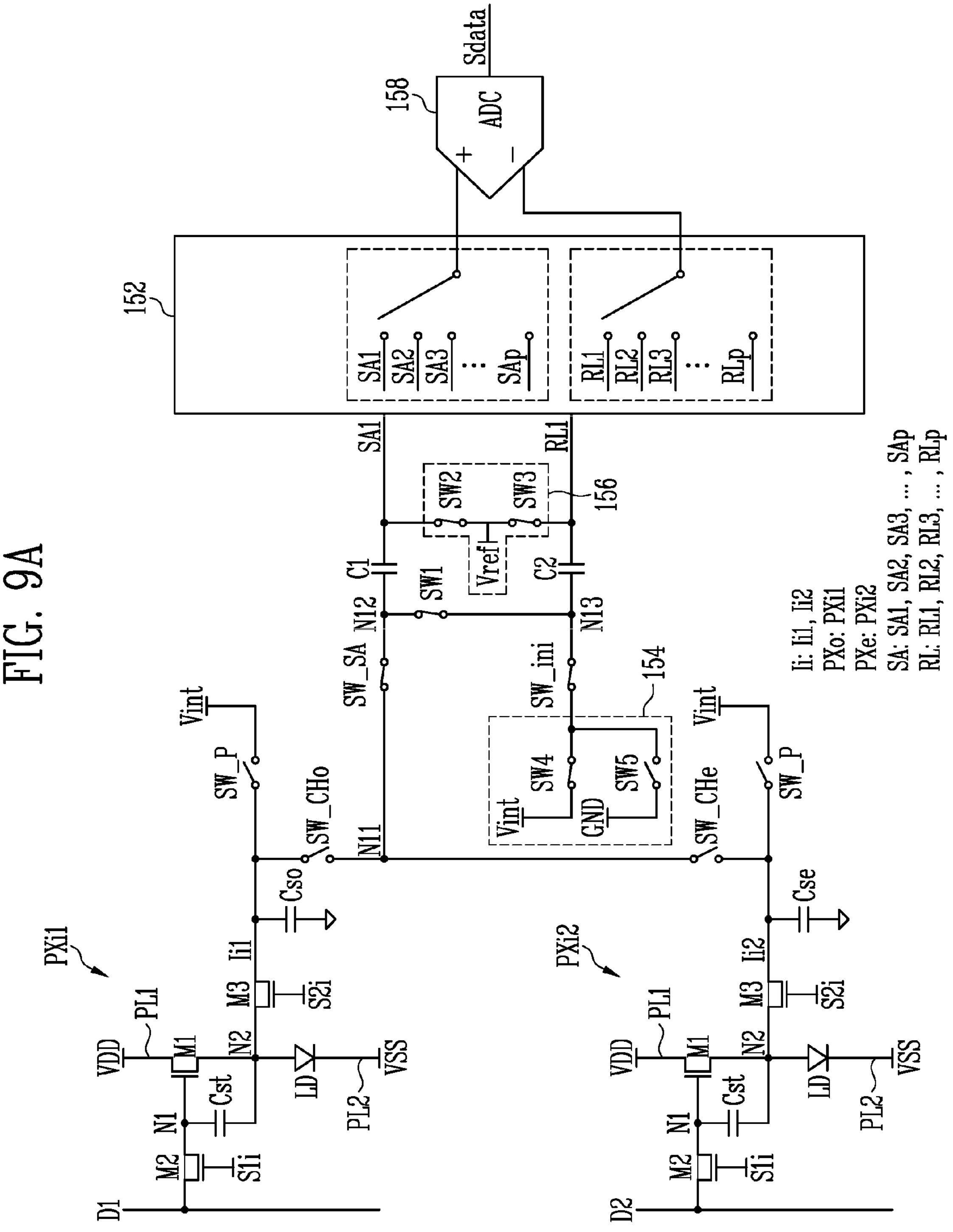
FIGS. 9A to 9D are schematic diagrams illustrating a process of generating sensing data during a second sensing period.

During the sensing period, at the fifth time point t5, as illustrated in FIGS. 7 and 9A, the sampling switch SW_SA, the initialization switch SW_ini, the first switch SW1, the second switch SW2, and the third switch SW3 may be turned on.

In case that the initialization switch SW_ini, the first switch SW1, and the sampling switch SW_SA are turned on, the voltage of the initialization power supply Vint may be supplied to the thirteenth node N13, the twelfth node N12, and the eleventh node N11, and the thirteenth node N13, the twelfth node N12, and the eleventh node N11 may be initialized.

In case that the second switch SW2 and the third switch SW3 are turned on, the voltage of the reference power supply Vref (or the initialization power supply Vint) may be supplied to the sampling line SA1 and the reference line RL1. The sampling line SA1 and the reference line RL1 may be initialized to the voltage of the reference power supply Vref.

At the sixth time point t6, as illustrated in FIG. 7, the sampling switch SW_SA, the initialization switch SW_ini, the first switch SW1, the second switch SW2, and the third switch SW3 may be turned off.

Figure 9B:
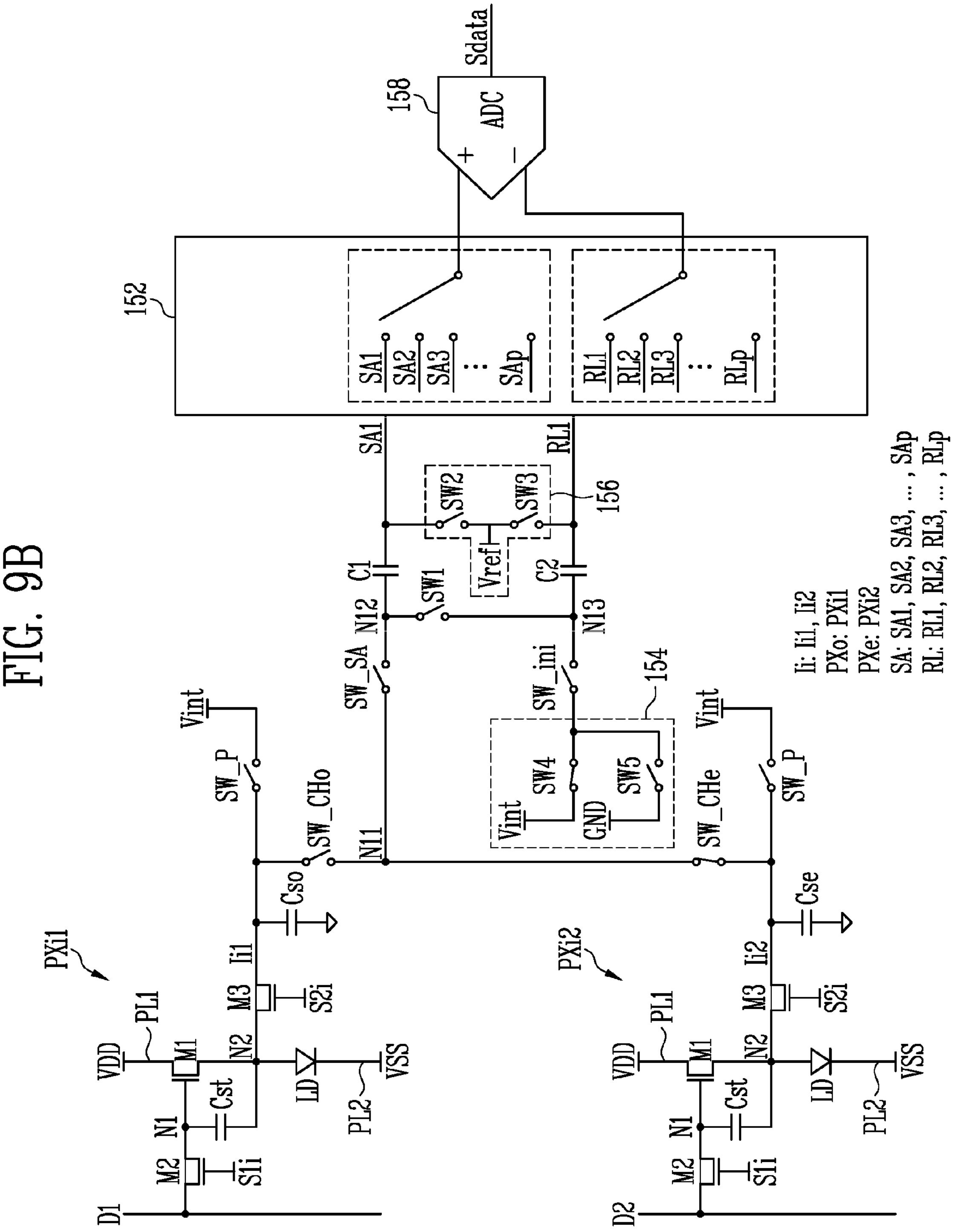

At a seventh time point t7, as illustrated in FIGS. 7 and 9B, the second channel switch SW_Che may be turned on. In case that the second channel switch SW_Che is turned, the second sensing capacitor Cse may be electrically connected to the eleventh node N11.

Figure 9C:
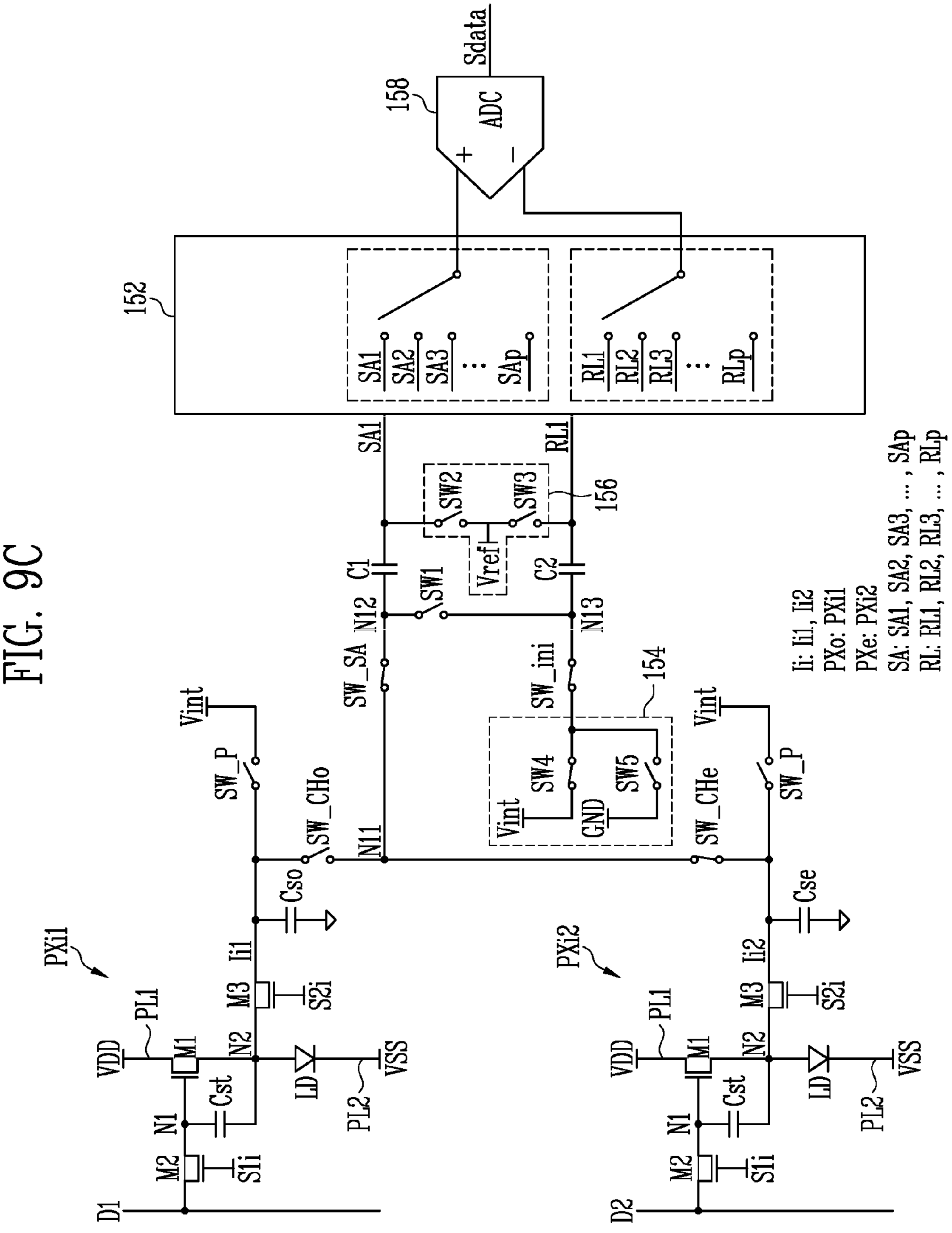

At an eighth time point t8, as illustrated in FIGS. 7 and 9C, the sampling switch SW_SA and the initialization switch SW_ini may be turned on. In case that the initialization switch SW_ini is turned on, the voltage of the initialization power supply Vint may be supplied to the thirteenth node N13, and the reference line RL1 may be maintained at the voltage of the reference power supply Vref.

In case that the sampling switch SW_SA is turned on, the voltage of the twelfth node N12 may be increased by the second sensing voltage of the second sensing capacitor Cse. In case that the voltage of the twelfth node N12 increases, the voltage of the sampling line SA1 may also be increased due to the coupling of the first capacitor C1. For example, the voltage of the sampling line SA1 may be changed by the second sensing voltage, and the threshold voltage and/or mobility information of the first transistor M1 included in the second pixel Pxi2 may be included in the voltage of the sampling line SA1.

Figure 9D:
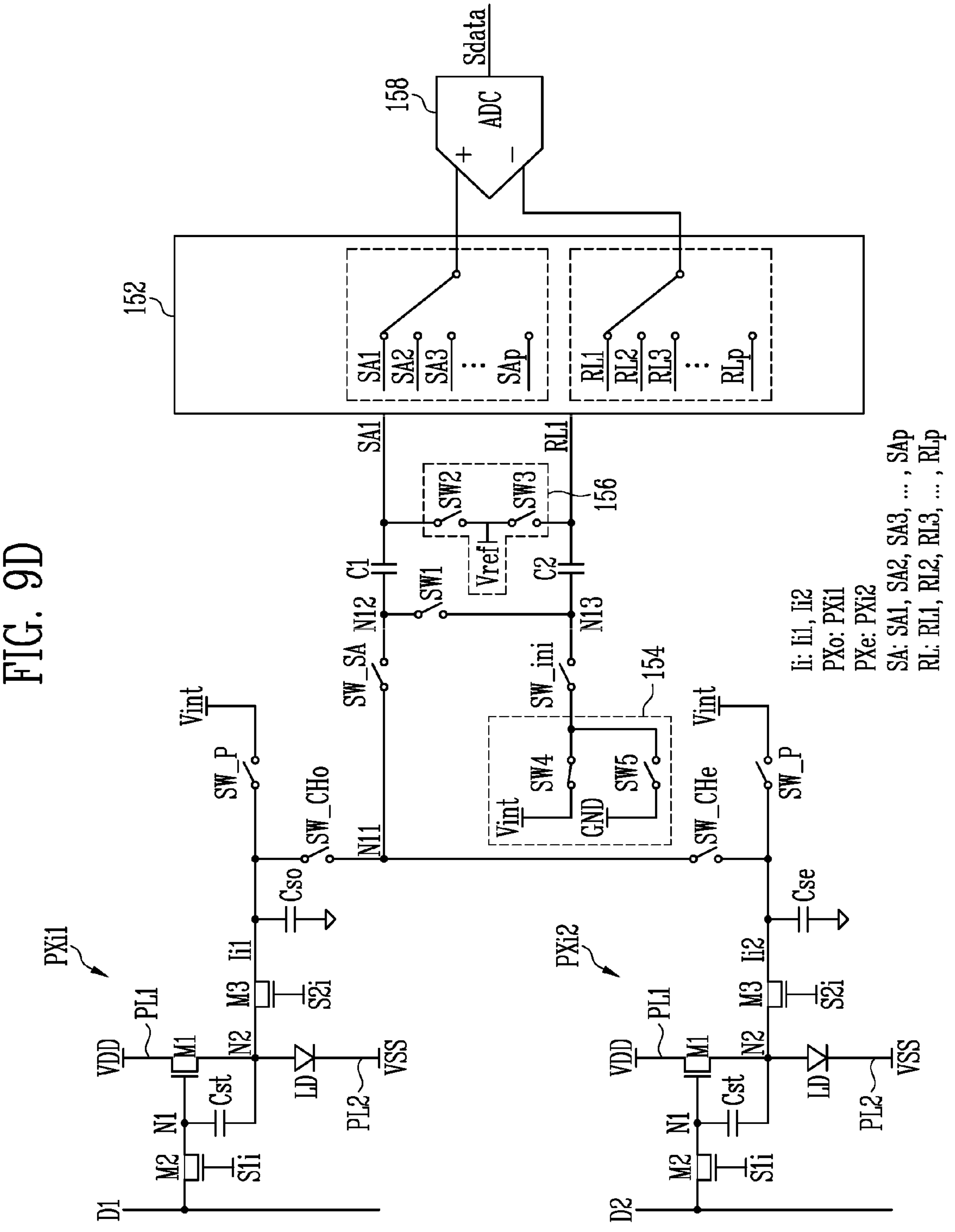

At a ninth time point t9, as illustrated in FIGS. 7 and 9D, the sampling switch SW_SA and the initialization switch SW_ini may be turned off. Thereafter, during a period between the ninth time point t9 and the tenth time point t10, the multiplexer 152 may sequentially connect the sampling lines SA1 to SAp to the ADC 158, and may sequentially connect the reference lines RL1 to RLp to the ADC 158.

The ADC 158 may sequentially generate sensing data Sdata corresponding to the voltages of the sampling lines SA1 to SAp connected to the ADC 158, which represent the second sensing voltage. For example, the ADC 158 may sequentially generate sensing data Sdata corresponding to the sensing voltage from the second pixels Pxe located on the i-th pixel row (e.g., the pixels located on the even-numbered pixel columns).

In an embodiment of the disclosure, to minimize a deviation in characteristics between the first pixels Pxo and the second pixels Pxe, the sampling switch SW_SA may be turned on during a first time in case that the first sensing voltage is supplied from the first sensing capacitor Cso to the sampling line SA (for example, from the third time point t3 to the fourth time point t4), and may be turned on during a second time in case that the second sensing voltage is supplied from the second capacitor Cse to the sampling line SA (for example, from the eighth time point t8 to the ninth time point t9). The second time and the first time may be different from each other.

In an embodiment of the disclosure, in case that the first sensing capacitor Cso is charged with the first sensing voltage, the second sensing capacitor Cse may also be charged with the second sensing voltage. After first sensing data Sdata(o) (see, e.g., FIG. 17) is generated from the first pixels Pxo, second sensing data Sdata(e) (see, e.g., FIG. 17) may be generated from the second pixels PXe. Hence, the sensing period may be reduced.

In case that a driving waveform such as the waveform shown in FIG. 7 is provided during the sensing period, there may be a deviation in characteristics between the first sensing data Sdata(o) generated from the first pixels PXo and the second sensing data Sdata(e) generated from the second pixels PXe.

For example, during the first sensing period in which the first pixels PXo are sensed, the first channel switch SW_CHo may be turned on and, the sampling switch SW_SA, the initialization switch SW_ini, the first switch SW1, the second switch SW2, and the third switch SW3 may be turned on, and the twelfth node N12 and the thirteenth node N13 may be initialized (during a period from the second time point t2 to the third time point t3). Subsequently, while the sampling switch SW_SA remains turned on, the first sensing voltage of the first sensing capacitor Cso may be supplied to the twelfth node N12.

Thereafter, during a period between the fifth time point t5 and the sixth time point t6, the sampling switch SW_SA, the initialization switch SW_ini, the first switch SW1, the second switch SW2, and the third switch SW3 may be turned on, and the twelfth node N12 and the thirteenth node N13 may be initialized. After the twelfth node N12 and the thirteenth node N13 are initialized, the sampling switch SW_SA may be set to a turn-off state. Thereafter, the second channel switch SW_CHe may be turned on, and the sampling switch SW_SA may be turned on. As a result, the second sensing voltage of the second sensing capacitor Cse may be supplied to the twelfth node N12.

For example, the first sensing voltage may be supplied to the twelfth node N12 while the sampling switch SW_SA remains turned on, and the second sensing voltage may be supplied to the twelfth node N12 after the sampling switch SW_SA is converted from a turn-off state to a turn-on state. A process of supplying the first sensing voltage to the twelfth node N12 and a process of supplying the second sensing voltage to the twelfth node N12 may be set to be different from each other, and sensing deviations may occur.

For example, at the third time point t3, after the panel switch SW_P is turned-off, the first sensing voltage may be stored in the first sensing capacitor Cso, and the second sensing voltage may be stored in the second sensing capacitor Cse.

Thereafter, the first sensing voltage may be supplied to the twelfth node N12 while the sampling switch SW_SA remains turned on. On the other hand, the second sensing voltage may be supplied to the twelfth node N12 after at least one cycle (or a regular interval) of the sampling switch SW_SA being turned off and turned on, and sensing deviations may occur.

The second sensing voltage stored in the second sensing capacitor Cse may be supplied to the twelfth node N12 after being set to a floating state for a period (e.g., a certain or selectable period) of time. Furthermore, although the first sensing voltage stored in the first sensing capacitor Cso is supplied directly to the twelfth node N12 after the sensing line Ii is initialized by the panel switch SW_P, the second sensing voltage stored in the second sensing capacitor Cse may be supplied to the twelfth node N12 without performing the initialization process by the panel switch SW_P. As such, there may be differences between a process of sensing the first sensing voltage and a process of sensing the second sensing voltage. The differences may cause sensing deviations.

In an embodiment of the disclosure, as depicted by the dashed lines in FIG. 7, the sensing deviations may be removed by controlling a turn-on time SW_On of the sampling switch SW_SA, i.e., by controlling the second time of the sampling switch SW_SA.

Although it was described that the first pixels PXo are sensed during the first sensing period and the second pixels PXe are sensed during the second sensing period, the disclosure is not limited thereto. For example, the second pixels PXe may be sensed during the first sensing period, and the first pixels PXo may be sensed during the second sensing period. Furthermore, the pixels PXo or PXe to be sensed during the first sensing period may be changed on a pixel row basis.

Figure 10:
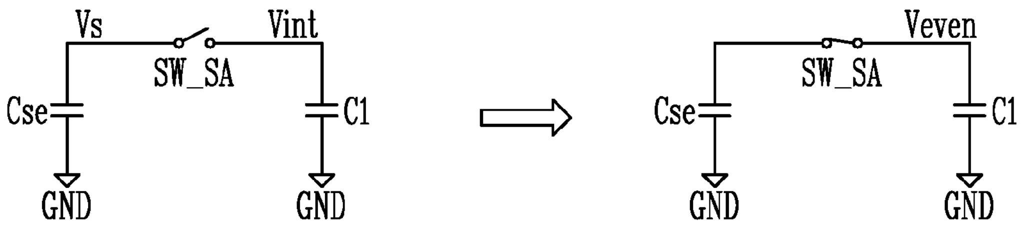
FIG. 10 is a schematic diagram illustrating an offset of second sensing data compared to first sensing data.

FIG. 10 is a schematic diagram illustrating an offset of second sensing data compared to first sensing data. FIG. 10 provides an equivalent and simplified illustration of a sensing channel, illustrating that the first capacitor C1 is connected to the base potential supply GND.

Referring to FIG. 10, after the second sensing capacitor Cse is charged with a sensing voltage Vs while the first capacitor C1 is supplied (or charged) with an initialization voltage Vint, the sampling switch SW_SA may be turned on. After the sampling switch SW_SA is turned on, the voltage of the first capacitor C1 may be changed to a constant voltage Veven. Hence, an offset of the second sensing capacitor Cse may be represented by Equation 1.

$$Qtotal = Cse \times Vs + C1 \times \mathrm{Vint} \quad \text{[Equation 1]}$$

$$Veven = Qtotal/(Cse + C1)$$

$$Veven = \left(Cse/(Cse + C1)\right) \times Vs + \left(C1/(Cse + C1)\right) \times \mathrm{Vint}$$

$$\mathrm{offset} = Vs - Veven$$

In Equation 1, Qtotal may be a total charge quantity, and Veven may be the constant voltage.

As described above, the second sensing voltage may have a sensing deviation, compared to the first sensing voltage. The equation 1 mathematically represents the sensing deviation (i.e., the offset) included in the second sensing voltage.

Figure 11:
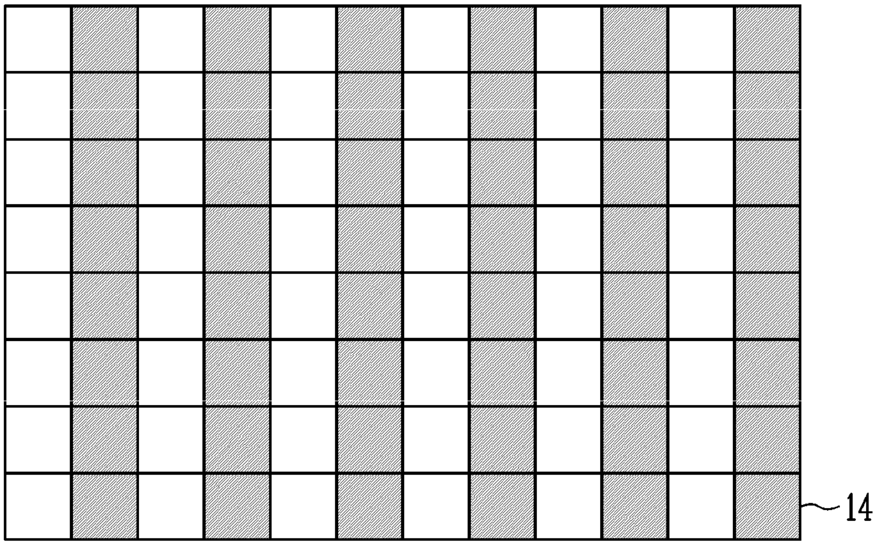
FIG. 11 is a schematic diagram illustrating an image displayed on a pixel component by an offset of sensing data in accordance with an embodiment of the disclosure.

FIG. 11 is a schematic diagram illustrating an image displayed on the pixel component 14 by an offset of sensing data in accordance with an embodiment of the disclosure. FIG. 11 illustrates an embodiment where the pixel component 14 displays a same grayscale of images using output data Dout converted by the sensing data Sdata supplied from the sensing component 15 (see, e.g., FIG. 1).

Referring to FIG. 11, the first pixels PXo may be sensed during the first sensing period, and the second pixels PXe may be sensed during the second sensing period. Second sensing data Sdata(e) (see, e.g., FIG. 17) of the second pixels PXe may have sensing deviations, compared to first sensing data Sdata(o) (see, e.g., FIG. 17) of the first pixels PXo.

For example, the pixel component 14 may display images corresponding to a same data. The timing controller 11 (see, e.g., FIG. 1) may convert input data Din using the first sensing data Sdata(o) and the second sensing Sdata(e) and generate output data Dout. Due to the sensing deviations, the pixel component 14 may generate light of different luminances on a pixel column basis corresponding to the same grayscale.

Figure 12:
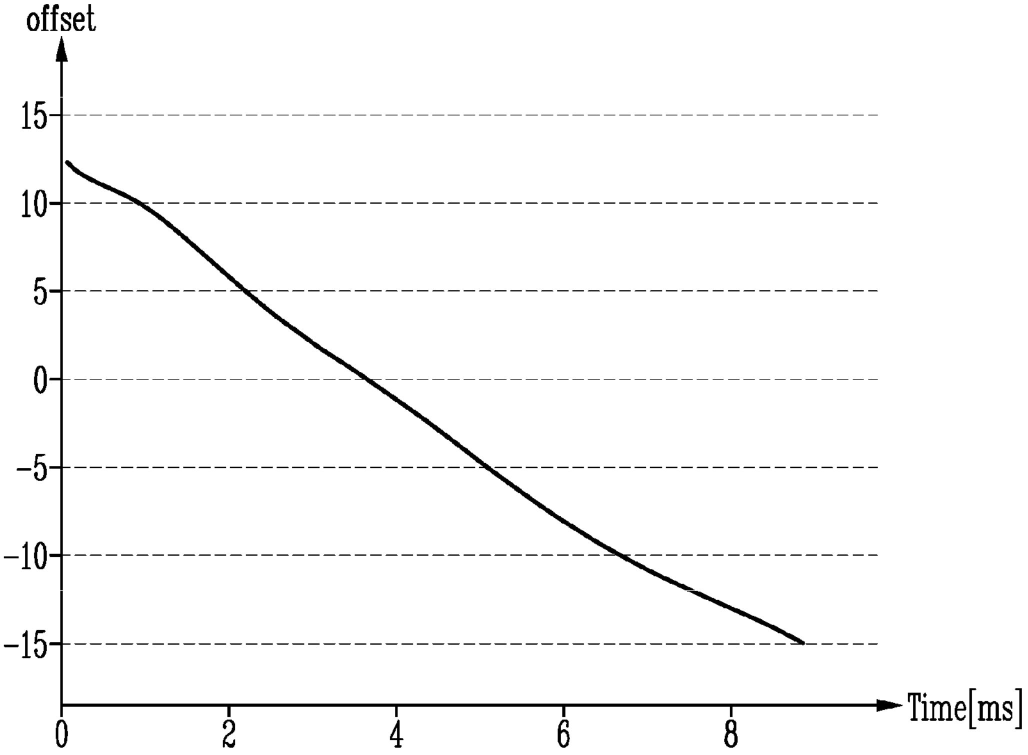
FIG. 12 is a schematic graph illustrating an offset corresponding to a turn-on time of a sampling switch.

FIG. 12 is a schematic graph illustrating an offset corresponding to a turn-on time of the sampling switch. In FIG. 12, an X-axis represents time, which is in milliseconds (ms), and a Y-axis represents digitized offset.

Referring to FIG. 12, the offsets of the second pixels PXe sensed during the second sensing period may be set to values depending on the turn-on time SW_On (see, e.g., FIG. 7) (i.e., the sampling time) of the sampling switch SW_SA (see, e.g., FIG. 10). For example, the offset may be minimized by controlling the turn-on time SW_On of the sampling switch SW_SA.

The turn-on time SW_On of the sampling switch SW_SA that minimizes the offset may be set to a value depending on a panel type, a manufacturing process, or the like.

Figure 13:
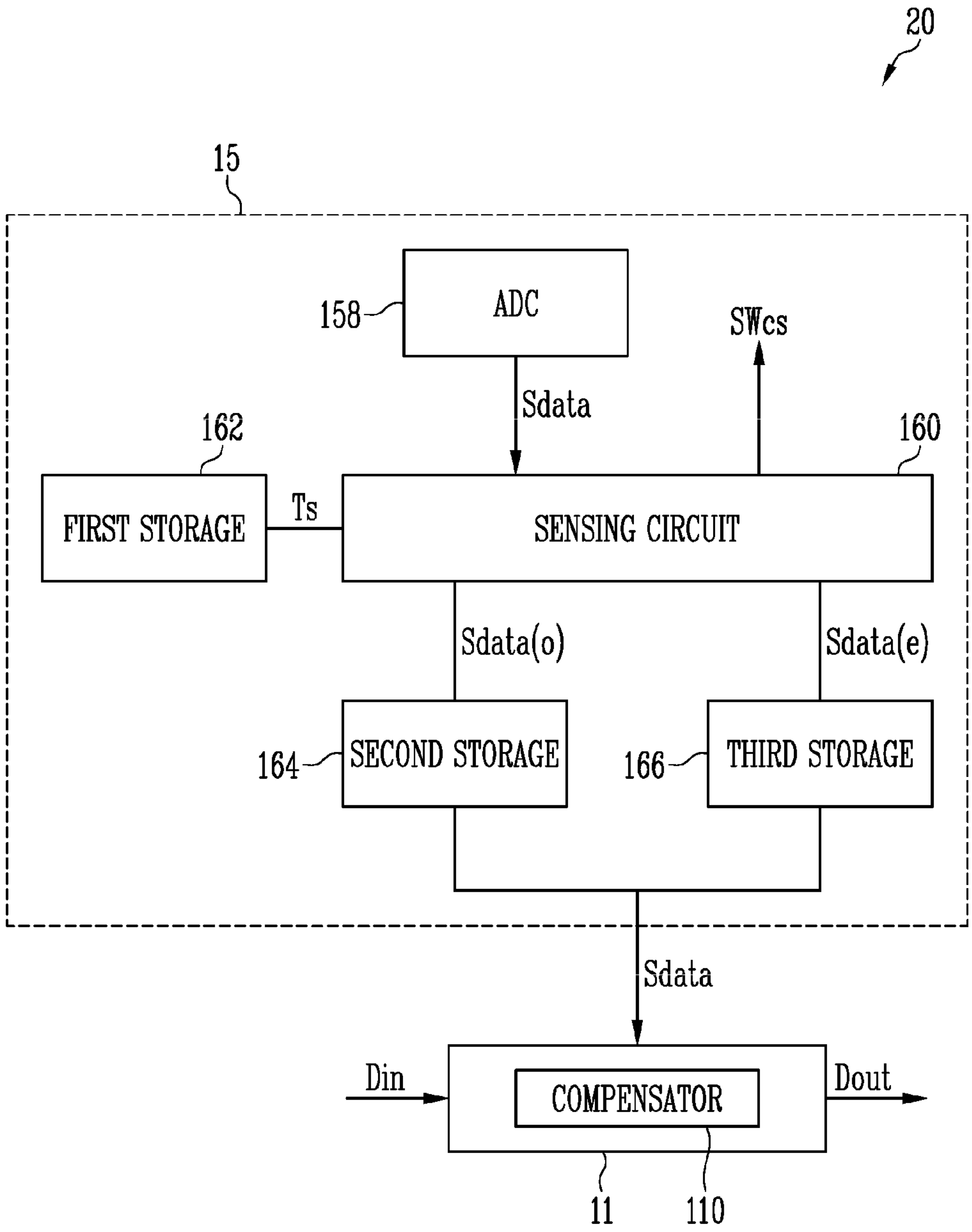
FIG. 13 is a schematic block diagram illustrating a driving circuit in accordance with an embodiment of the disclosure.

FIG. 13 is a schematic block diagram illustrating the driving circuit 20 in accordance with an embodiment of the disclosure.

Referring to FIG. 13, the driving circuit 20 in accordance with an embodiment of the disclosure may include a sensing component 15 and a timing controller 11.

The sensing component 15 may further include sensing channels (see, e.g., FIG. 4), and an ADC 158 connected to the sensing channels. Although, for the sake of clarity, FIG. 13 illustrates a single ADC 158, the disclosure are not limited thereto. In another embodiment, the sensing component 15 may include multiple ADCs 158.

The sensing component 15 may include a sensing circuit 160, a first storage 162, a second storage 164, and a third storage 166.

The first storage 162 may store sampling data Ts corresponding to the turn-on time SW_On (see, e.g., FIG. 7) of the sampling switch SW_SA (see, e.g., FIG. 10). During the first sensing period, the turn-on time SW_ON of the sampling switch SW_SA may be fixed. During the second sensing period, the turn-on time SW_ON of the sampling switch SW_SA may be set according to the sampling data Ts. The sampling data Ts may be set to minimize an offset of the second sensing data Sdata(e) generated during the second sensing period.

The second storage 164 may store the first sensing data Sdata(o) corresponding to the first pixels PXo (see, e.g., FIG. 4). The third storage 166 may store the second sensing data Sdata(e) corresponding to the second pixels PXe (see, e.g., FIG. 4).

The sensing circuit 160 may control operations of turning on or turning off the switches SW_CHo, SW_CHe, SW_SA, SW_ini, SW1, SW2, SW3, SW4, and SW5 (see, e.g., FIG. 4) included in the sensing channel. For example, the sensing circuit 160 may supply a switch control signal SWcs to the sensing channels. The sensing circuit 160 may control the turn-on time SW_On of the sampling switch SW_SA in response to the sampling data Ts.

The timing controller 11 may include a compensator 110. The compensator 110 may convert the input data Din using sensing data Sdata supplied from the sensing component 15, and output (or generate) the output data Dout.

Figure 14:
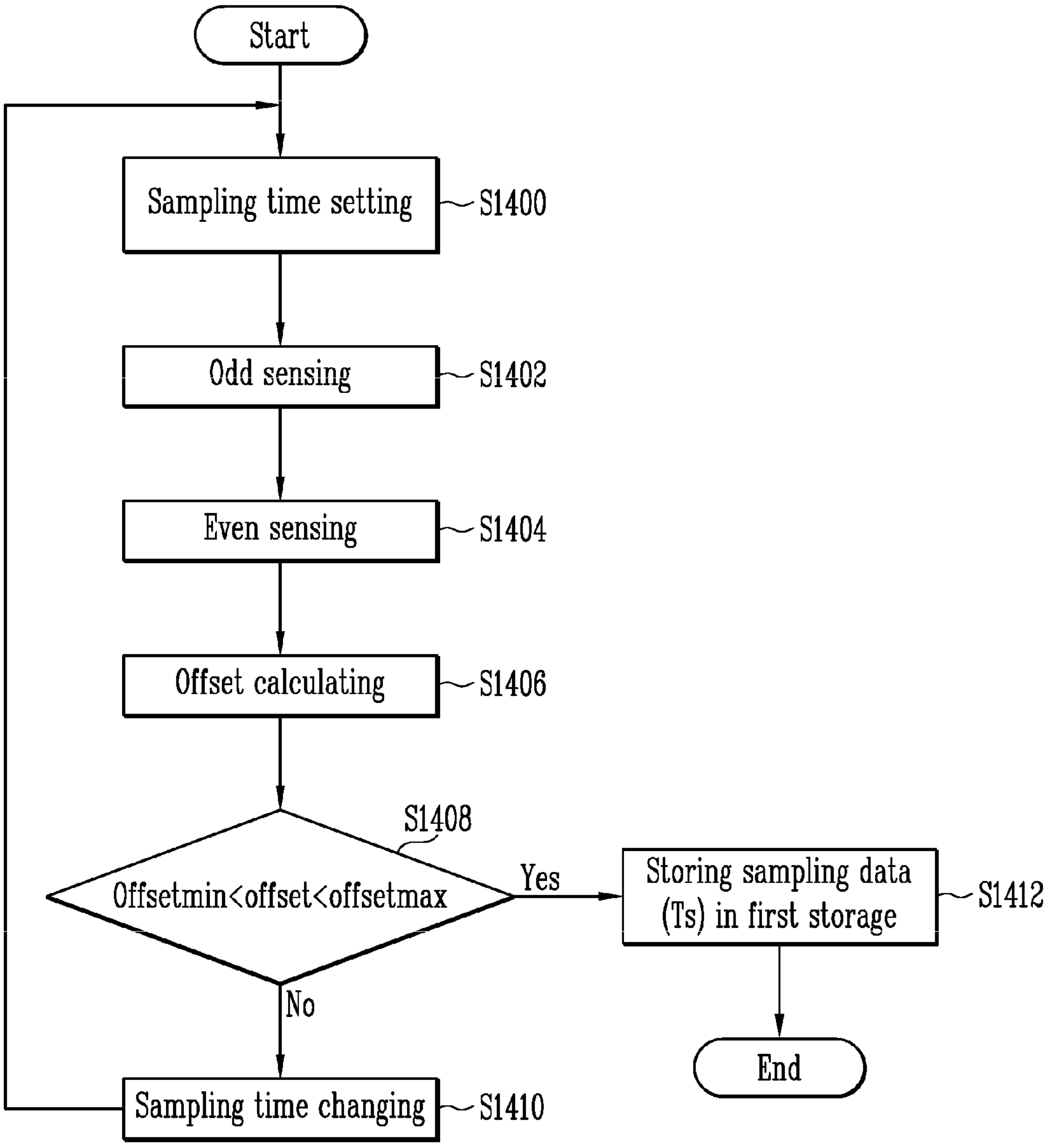
FIG. 14 is a schematic flowchart illustrating a process of storing sampling data in a first storage in accordance with an embodiment of the disclosure.
Figure 15A:
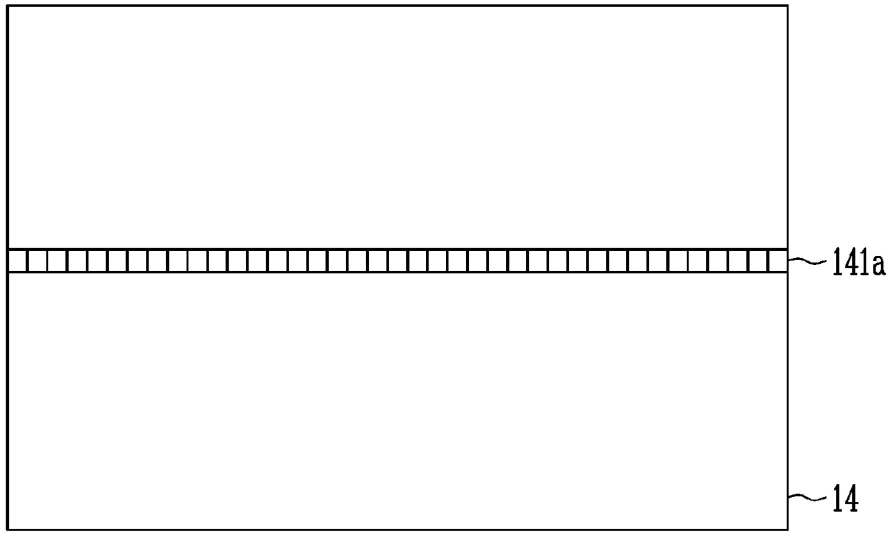
FIGS. 15A and 15B are schematic diagrams illustrating a pixel row in which sampling data is to be stored in accordance with an embodiment of the disclosure.
Figure 15B:
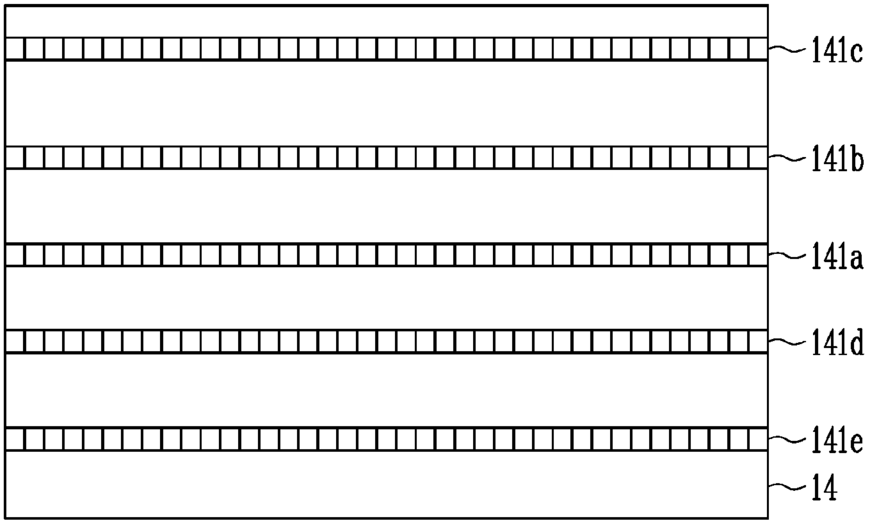
Figure 16:
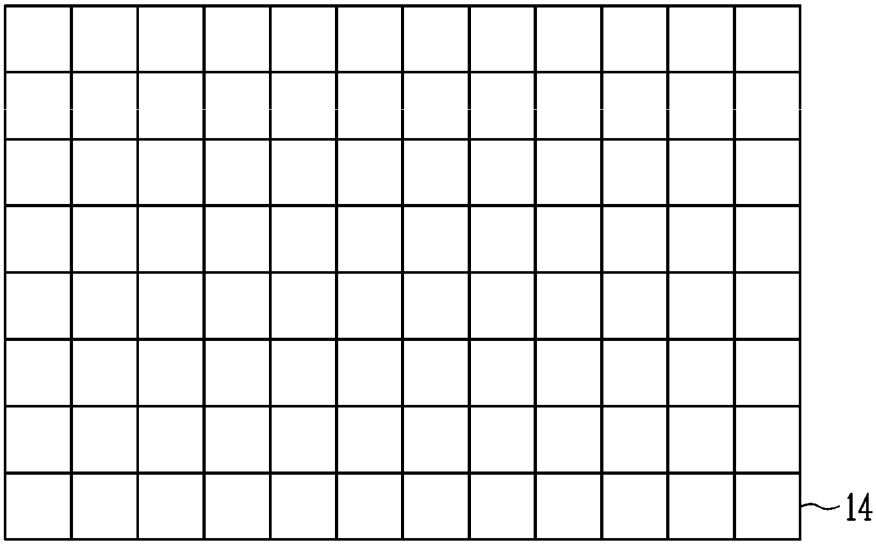
FIG. 16 is a schematic diagram illustrating an image displayed on a pixel component in response to the sampling data in accordance with an embodiment of the disclosure.

FIG. 14 is a schematic flowchart illustrating a process of storing sampling data in the first storage 162 in accordance with an embodiment of the disclosure. For example, FIG. 14 is a flowchart illustrating a process of resetting the sampling time during the second sensing period. FIGS. 15A and 15B are schematic diagrams illustrating a pixel row 141*a* in which the sampling data Ts (see, e.g., FIG. 13) is to be stored in accordance with an embodiment of the disclosure. FIG. 16 is a schematic diagram illustrating an image displayed on a pixel component 14 in response to the sampling data in accordance with an embodiment of the disclosure.

Sampling data Ts corresponding to an initial sampling time may be stored in the first storage 162 (see, e.g., FIG. 13). The initial sampling time may be determined based on characteristics of a panel during a manufacturing process. A minimum offset value Offsetmin and a maximum offset value Offsetmax may be stored in the first storage 162.

The minimum offset value Offsetmin and the maximum offset value Offsetmax may have a range (e.g., a certain or selectable range), which is a range where the offset of the second sensing data Sdata(e) generated during the second sensing period can be minimized. For example, the minimum offset value Offsetmin may be set to about "−5" (see, e.g., FIG. 12), and the maximum offset value may be set to about "5" (see, e.g., FIG. 12). The minimum offset value Offsetmin and maximum offset value Offsetmax may be experimentally determined taking into account the characteristics of the panel.

Referring to FIGS. 13 and 14, the sensing circuit 160 may load the sampling data Ts, the minimum offset value Offsetmin, and the maximum offset value Offsetmax from the first storage 162. The sensing circuit 160 that has loaded the sampling data Ts may set a turn-on time SW_On (i.e., the sampling time) of the sampling switch SW_SA corresponding to the sampling data Ts (at step S1400).

The sensing circuit 160 that has set the turn-on time SW_On (see, e.g., FIG. 7) of the sampling switch SW_SA (see, e.g., FIG. 10) may generate first sensing data Sdata(o) (see, e.g., FIG. 17) corresponding to the first sensing voltage during the first sensing period while supplying a switch control signal SWcs to the sensing channels (at step S1402). The first sensing data Sdata(o) generated during the first sensing period may be stored in the second storage 164. During the first sensing period, the turn-on time SW_On of the sampling switch SW_SA may be fixed to a time (e.g., a certain or selectable time) regardless of the sampling data Ts.

The sensing circuit 160 may generate second sensing data Sdata(e) corresponding to the second sensing voltage during the second sensing period while supplying a switch control signal SWcs to the sensing channels (at step S1404). The second sensing data Sdata(e) may be stored in the third storage 166.

The sensing circuit 160 may calculate an offset by subtracting the second sensing data Sdata(e) from the first sensing data Sdata(o) (at step S1406). For example, with regard to the first pixel PXo (see, e.g., FIG. 4) and the second pixel PXe (see, e.g., FIG. 4) that share the sensing channel, the sensing circuit 160 may calculate an offset by subtracting the second sensing data Sdata(e) of the second pixel from the first sensing data Sdata(o) of the first pixel PXo.

The sensing circuit 160 may determine whether the offset generated at step S1406 is positioned between the minimum offset value Offsetmin and the maximum offset value Offsetmax (at step S1408). In case that the offset is positioned between the minimum offset value Offsetmin and the maximum offset value Offsetmax at step S1408, the sensing circuit 160 may store sampling data Ts corresponding to the sampling time set (at step S1400) in the first storage 162 (at step S1412).

In case that the offset is not positioned between the minimum offset value Offsetmin and the maximum offset value Offsetmax at step S1408 (at step S1410), steps S1400 to S1408 may be repeatedly performed until the offset is positioned between the minimum offset value Offsetmin and the maximum offset value Offsetmax (at steps S1402 to S1408). In case that the offset is positioned between the minimum offset value Offsetmin and the maximum offset value Offsetmax, the sensing circuit 160 may store sampling data Ts corresponding to the sampling time in the first storage 162 (at step S1412).

In case that the sampling time is set (see, e.g., FIG. 14), the sampling data Ts corresponding to each of the sensing channels may be stored in the first storage 162.

In an embodiment, the sensing circuit 160 may control, using the sampling data Ts of each of the sensing channels, the turn-on time SW_On of the sampling switch SW_SA included in the corresponding sensing channel. The turn-on times SW_On of the sampling switches SW_SA included in at least two sensing channels among multiple sensing channels may be set to be different from each other.

In an embodiment, the sensing circuit 160 may average the sampling data Ts of the respective sensing channels, and may control, using the averaged sampling data Ts, the turn-on time SW_On of the sampling switch SW_SA included in the corresponding sensing channel.

In an embodiment, as illustrated in FIG. 15A, the sensing circuit 160 may generate pieces of sampling data Ts from the sensing channels corresponding to a single pixel row 141*a*, and may apply sampling data Ts obtained by averaging the pieces of sampling data Ts to the sensing channels of all of pixel rows. A storage time of the sampling data Ts may be minimized.

In an embodiment, as illustrated in FIG. 15B, the sensing circuit 160 may generate pieces of sampling data Ts from the sensing channels corresponding to multiple pixel rows 141*a*, 141*b*, 141*c*, 141*d*, and 141*e* spaced apart from each other at regular intervals, and may apply sampling data Ts obtained by averaging the pieces of sampling data Ts of the pixel rows to the sensing channels of all of the pixel rows.

In an embodiment, the sensing circuit 160 may generate pieces of sampling data Ts from the sensing channels corresponding to all of the pixel rows, and may average the pieces of sampling data Ts corresponding to all of the pixel rows and apply the averaged sampling data Ts to the sensing channels of all of the pixel rows. In an embodiment, the sensing circuit 160 may control the turn-on time SW_On of the sampling switch SW_SA for each sensing channel using different sampling data Ts for each sensing channel, without averaging pieces of sampling data Ts of the respective sensing channels.

As described above, in an embodiment of the disclosure, the sampling time of the second sensing period (i.e., the turn-on time of the sampling switch SW_SA) may be set to minimize the offset of the first sensing data Sdata(o) and the second sensing data Sdata(e). Hence, the pixel component 14 may display an image having a uniform luminance.

A process of setting the sampling time of the second sensing period (i.e., a process of storing the sampling data Ts) may be performed at least more than one time, and the pixel component 14 may display an image having a uniform luminance, as shown in FIG. 16.

The process of setting the sampling time of the second sensing period may be performed on a cycle (or with a regular interval) after the display device 10 (see, e.g., FIG. 1) has been shipped. For example, each time the display device 10 is turned on or turned off, the process (steps S1400 to S1412) (see, e.g., FIG. 14) may be repeated on a cycle, and the sampling data Ts may be stored in the first storage 162. It is possible to secure a reliability of external compensation regardless of a usage time of the display device 10.

Figure 17:
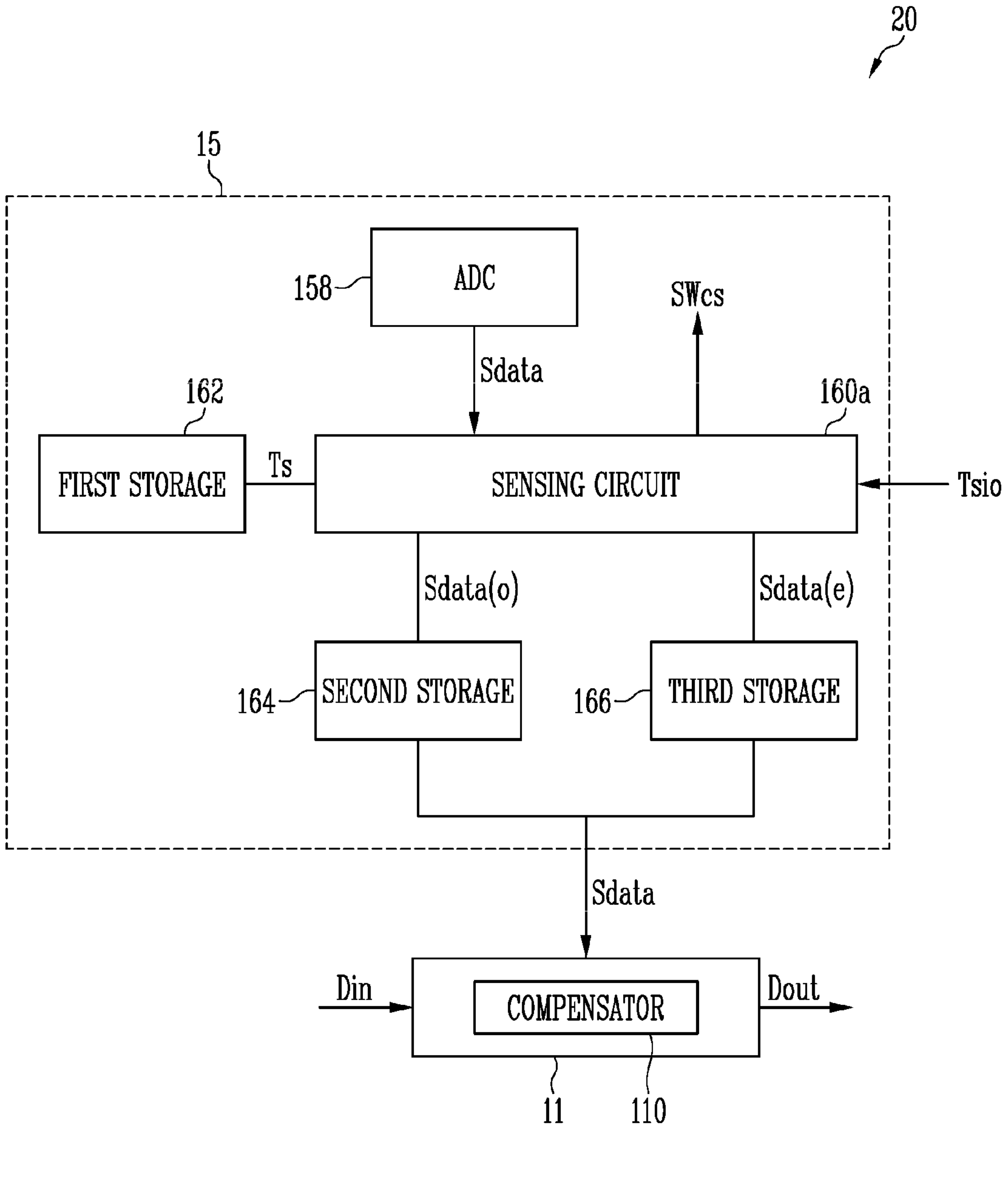
FIG. 17 is a schematic block diagram illustrating a driving circuit in accordance with an embodiment of the disclosure.

FIG. 17 is a schematic block diagram illustrating a driving circuit in accordance with an embodiment of the disclosure. In the following description of FIG. 17, the same reference numerals will be used to designate the same components as those of FIG. 13, and detailed explanation of the same components will be omitted.

Referring to FIG. 17, a sensing circuit 160*a* may receive external sampling data Tsio from an external device. For example, panels of a same type formed through a same process may have similar characteristics. Some panels may generate sampling data Ts through the process described with reference to FIG. 14. Other panels may supply the sampling data Ts generated from the some panels as external sampling data Tsio.

The sensing circuit 160*a* may store the external sampling data Tsio in the first storage 162 as the sampling data Ts.

Figure 18:
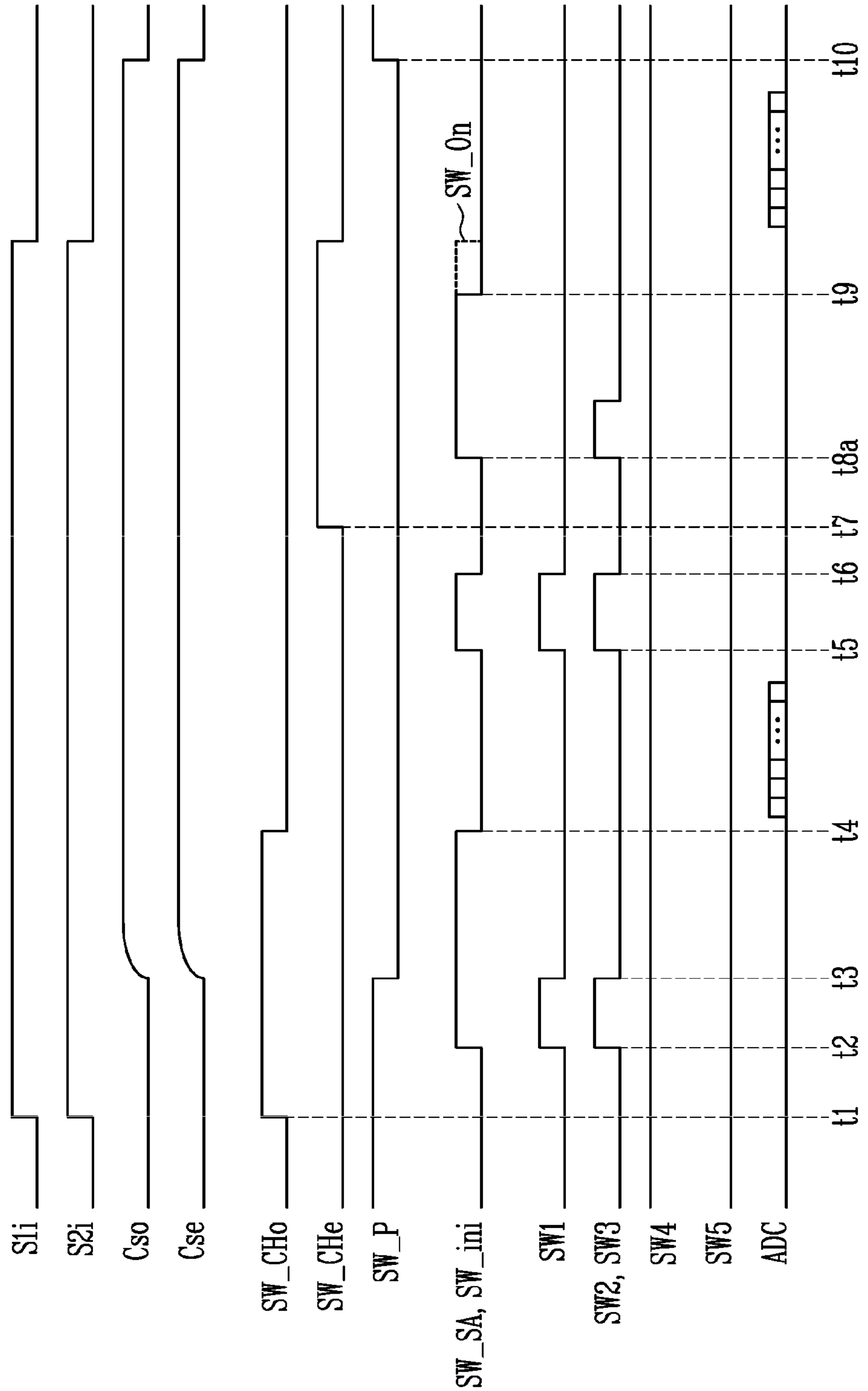
FIG. 18 is a schematic waveform diagram illustrating a driving waveform supplied during a sensing period in accordance with an embodiment of the disclosure.

FIG. 18 is a schematic waveform diagram illustrating a driving waveform supplied during a sensing period in accordance with an embodiment of the disclosure. In the following description of FIG. 18, redundant explanation pertaining to the same configuration as that of FIG. 7 will be omitted.

Referring to FIGS. 4 and 18, the second switch SW2 and the third switch SW3 may be turned on during a period (e.g., a certain or selectable period) between an 8*a*-th time point t8*a* and the ninth time point t9. In case that the second switch SW2 and the third switch SW3 are turned on, the voltage of the reference power supply Vref may be supplied to the sampling line SA and the reference line RL. A voltage of the sampling line SA may be prevented from rapidly varying in response to the voltage of the twelfth node N12.

Figure 19:
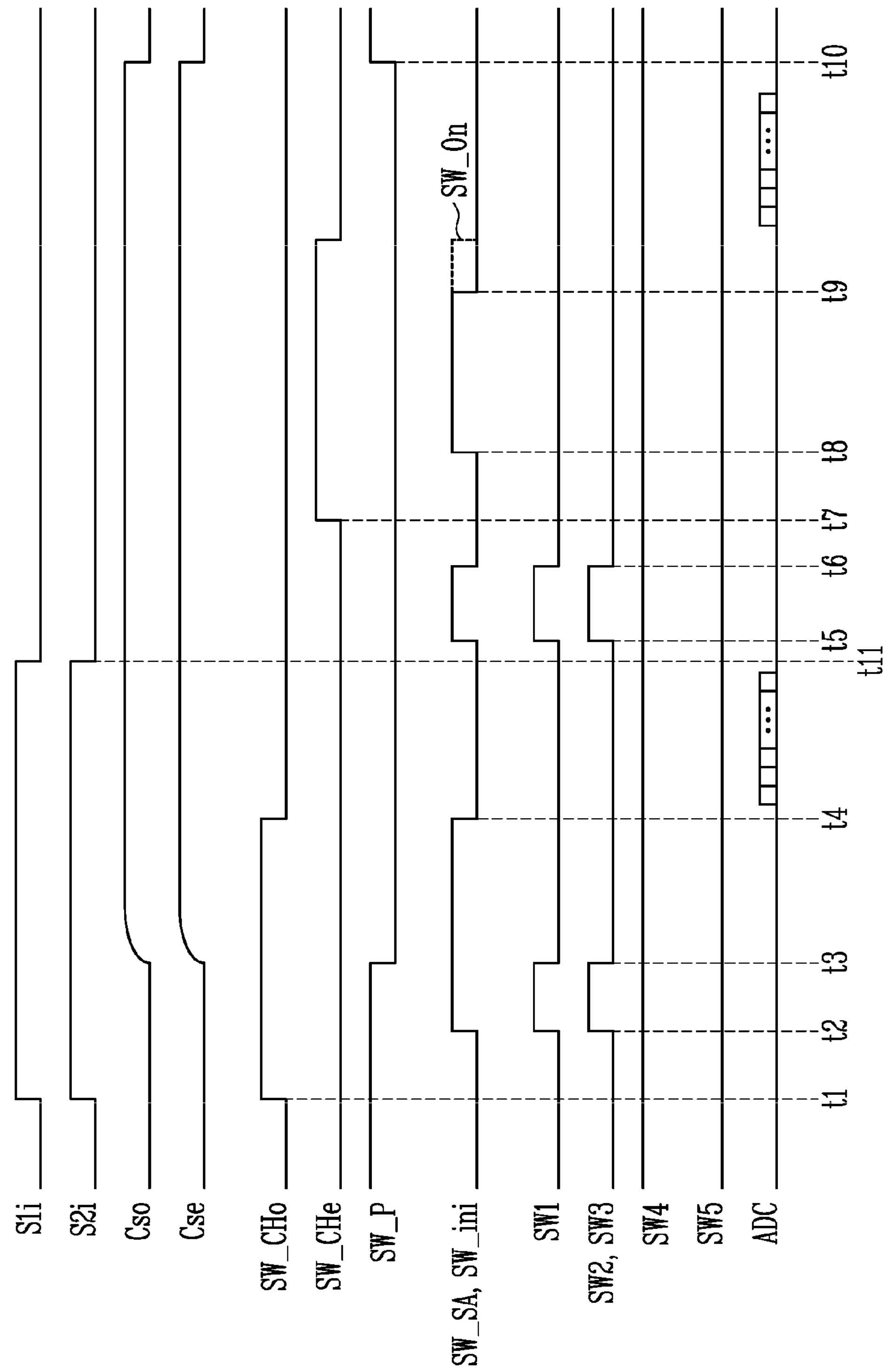
FIG. 19 is a schematic waveform diagram illustrating a driving waveform supplied during a sensing period in accordance with an embodiment of the disclosure.

FIG. 19 is a schematic waveform diagram illustrating a driving waveform supplied during a sensing period in accordance with an embodiment of the disclosure. In the following description of FIG. 19, redundant explanation pertaining to the same configuration as that of FIG. 7 will be omitted.

Referring to FIGS. 4 and 19, at an eleventh time point t11 positioned between the fourth time point t4 and the fifth time point t5, the supply of the first scan signal to the first scan line S1*i* and the supply of the second scan signal to the second scan line S2*i* may be interrupted.

In case that the supply of the first scan signal to the first scan line S1*i* is interrupted, the second transistor M2 included in each of the pixels may be turned off. In case that the supply of the second scan signal to the second scan line S2*i* is interrupted, the third transistor M3 included in each of the pixels may be turned off.

Because each of the first sensing capacitor Cso and the second sensing capacitor Cse has been charged with the sensing voltage before the eleventh time point t11, the sensing process may be performed regardless of the turn-off of the transistors M2 and M3.

Figure 20:
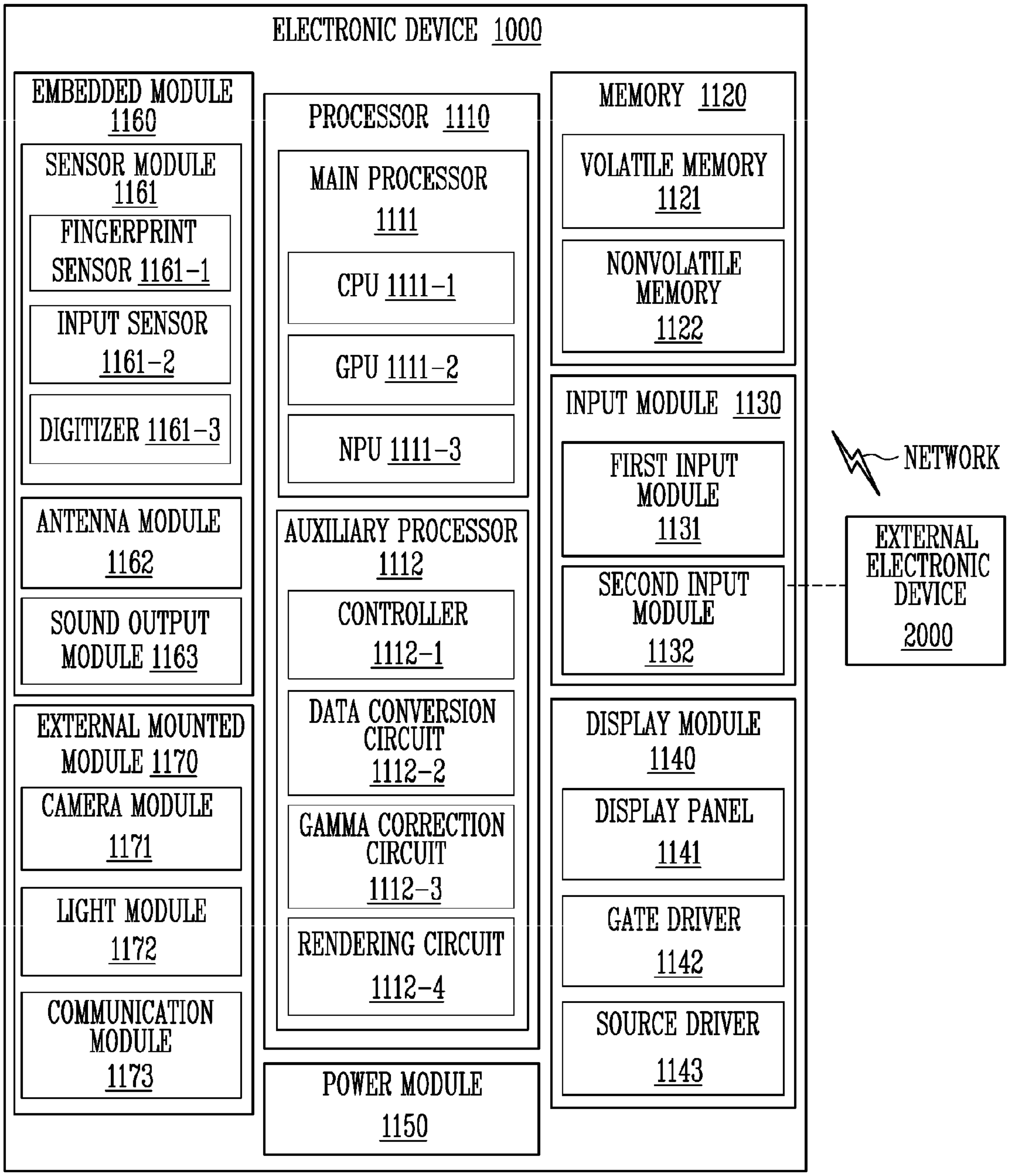
FIG. 20 is a schematic block diagram illustrating an electronic device in accordance with an embodiment of the disclosure.

FIG. 20 is a schematic block diagram illustrating an electronic device 1000 in accordance with an embodiment of the disclosure.

Referring to FIG. 20, the electronic device 1000 in accordance with an embodiment of the disclosure may output a variety of information through a display module 1140. In case that a processor 1110 executes an application stored in a memory 1120, the display module 1140 may provide application information to a user through a display panel 1141.

The processor 1110 may obtain an external input through an input module 1130 or a sensor module 1161, and execute an application corresponding to the external input. For example, in case that a user selects a camera icon (or a camera application icon) displayed on the display panel 1141, the processor 1110 may obtain a user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

In another embodiment, in case that personal information authentication is executed through the display module 1140, a fingerprint sensor 1161-1 may obtain input fingerprint information as input data. The processor 1110 may compare input data obtained through the fingerprint sensor 1161-1 with authentication data stored in the memory 1120, and may execute an application depending on a result of the comparison between the input data and the authentication data. The display module 1140 may display, on the display panel 1141, information executed according to a logic of the application. The fingerprint sensor 1161-1 may obtain fingerprint information in an overall area of the display module 1140 (or the display panel 1141).

In another embodiment, in case that a music streaming icon displayed on the display module 1140 is selected, the processor 1110 may obtain a user input through the input sensor 1161-2, and activate a music streaming application stored in the memory 1120. In case that a music playing command is inputted in the music streaming application, the processor 1110 may activate a sound output module 1163 and provide sound information corresponding to the music playing command to a user.

As described above, an operation of the electronic device 1000 has been schematically described. Hereinafter, configuration of the electronic device 1000 will be described in detail. Some of the components of the electronic device 1000 described below may be integrated in a single component, or a component may be separated into at least two of components.

The electronic device 1000 may communicate with an external electronic device 2000 through a network (e.g., a short-range wireless communication network or a long-range wireless communication network). In an embodiment, the electronic device 1000 may include a processor 1110, a memory 1120, an input module 1130, a display module 1140, a power module 1150, an embedded module 1160, and an external mounted module 1170. In an embodiment, in the electronic device 1000, at least one of the components may be omitted, or one or more other components may be added. In an embodiment, some components (e.g., the sensor module 1161, an antenna module 1162, or the sound output module 1163) among the components may be integrated in another component (e.g., the display module 1140).

The processor 1110 may execute software, control at least one other component (e.g., a hardware or software component) of the electronic device 1000 connected to the processor 1110, and perform various data processing or computing operations. In an embodiment, as at least a portion of a data processing or computing operation, the processor 1110 may store, in a volatile memory 1121, a command or data received from another component (e.g., the input module 1130, the sensor module 1161, or a communication module 1173), process the command or data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 and an application processor (AP). The main processor 1111 may further include one or more of a graphic processing unit (GPU) 1111-2, a communication processor (CP), and an image signal processor (ISP). The main processor 1111 may further include a neural processing unit (hereinafter, referred to as NPU) 1111-3. The NPU 1111-3 may be a processor specialized to process an artificial intelligence model. The artificial intelligence model may be generated by machine learning. The artificial intelligence model may include multiple artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, the like, or a combination of at least two of the foregoing networks, but the disclosure is not limited thereto. The artificial intelligence model may not only include a hardware structure but also include an additional or substitutive software structure. At least two of the processing units and the processors may be implemented as a single integrated component (e.g., a single chip). In another embodiment, the processing units and the processors may be implemented as respective independent components (e.g., multiple chips).

The auxiliary processor 1112 may include a controller 1112-1. The controller 1112-1 may include an interface conversion circuit, a timing control circuit, the like, or a combination thereof. The controller 1112-1 may receive an image signal from the main processor 1111, and may convert a data format of the image signal to a format corresponding to specifications of an interface with the display module 1140 and output image data. The controller 1112-1 may output various control signals needed to drive the display module 1140.

The auxiliary processor 1112 may further include a data conversion circuit 1112-2, a gamma correction circuit 1112-3, a rendering circuit 1112-4, a touch control circuit (not shown), the like, or a combination thereof. The data conversion circuit 1112-2 may receive image data from the controller 1112-1, compensate for the image data to display an image at a luminance (e.g., a desired luminance) according to characteristics of the electronic device 1000 or settings of a user, or may convert the image data and reduce power consumption, or compensate for afterimages.

The controller 1112-1 and the data conversion circuit 1112-2 may include the driving circuit 20 (see, e.g., FIG. 1). For example, the controller 1112-1 and the data conversion circuit 1112-2 may be integrated in a single IC, which includes configuration of the driving circuit 20.

The gamma correction circuit 1112-3 may convert image data, a gamma reference voltage, or the like, and an image displayed on the electronic device 1000 can have desired gamma characteristics. The rendering circuit 1112-4 may receive image data from the controller 1112-1, and render the image data taking into account pixel arrangement or the like on the display panel 1141 applied to the electronic device 1000.

The touch control circuit may supply a touch signal to the input sensor 1161-2, and receive a sensing signal from the input sensor 1161-2 in response to the touch signal.

At least one of the data conversion circuit 1112-2, the gamma correction circuit 1112-3, the rendering circuit 1112-4, and the touch control circuit may be integrated in another component (e.g., the main processor 1111 or the controller 1112-1). At least one of the data conversion circuit 1112-2, the gamma correction circuit 1112-3, and the rendering circuit 1112-4 may be integrated in a source driver 1143 to be described below.

The memory 1120 may store a variety of data to be used in at least one component (e.g., the processor 1110 or the sensor module 1161) of the electronic device 1000, and input data or output data for a command pertaining to the data. The memory 1120 may store a variety of setting data corresponding to settings of a user. The memory 1120 may include at least one of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device (e.g., a user or an external electronic device 2000) provided outside the electronic device 1000.

The input module 1130 may include a first input module 1131 that receives a command or data input from a user, and a second input module 1132 that receives a command or data inputted from the external electronic device 2000. The first input module 1131 may include a microphone, a mouse, a keyboard, a key (e.g., a button), a pen (e.g., a passive pen or an active pen), or the like. The second input module 1132 may support a designated protocol, which can be connected to the external electronic device 2000 in a wired or wireless manner. In an embodiment, the second input module 1132 may include a high definition multimedia interface (hereinafter, referred to as HDMI), a universal serial bus (hereinafter, referred to as USB) interface, an SD card interface, an audio interface, or the like. The second input module 1132 may include a connector, e.g., an HDMI connector, a USB connector, an SD card connector, an audio connector (e.g., a headphone connector), or the like and may be physically connected with the external electronic device 2000.

The display module 1140 may provide visual information to a user. The display module 1140 may include a display panel 1141, a gate driver 1142, a source driver 1143, the like, or a combination thereof. The display module 1140 may further include a window, a chassis, a bracket, the like, or a combination thereof, and protect the display panel 1141.

The display panel 1141 (or a display) may include a liquid crystal display panel, an organic light emitting display panel, an inorganic light emitting display panel, or the like. The type of display panel 1141 is not limited to a particular type. The display panel 1141 may be a rigid type panel, or a flexible type panel, which is rollable, bendable, or foldable. The display module 1140 may further include a support, a bracket, a heat dissipater, or the like, and may support the display panel 1141.

The gate driver 1142 may be mounted on the display panel 1141 as a driving chip. The gate driver 1142 may be integrated with the display panel 1141. For example, the gate driver 1142 may include an amorphous silicon TFT gate (ASG) driver circuit, a low temperature polycrystalline silicon (LTPS) TFT gate driver circuit, an oxide semiconductor TFT gate (OSG) driver circuit, or the like, and may be internalized in the display panel 1141. The gate driver 1142 may receive a control signal from the controller 1112-1, and output scan signals to the display panel 1141 in response to the control signal. The gate driver 1142 may include the scan driver 13 (see, e.g., FIG. 1).

The display module 1140 may further include an emission driver. The emission driver may output an emission control signal to the display panel 1141 in response to a control signal received from the controller 1112-1. The emission driver may be formed separately from the gate driver 1142, or may be integrated in the gate driver 1142.

The source driver 1143 may receive a control signal from the controller 1112-1, convert image data to an analog voltage (e.g., a data signal) in response to the control signal, and output data signals to the display panel 1141. The source driver 1143 may include the data driver 12 (see, e.g., FIG. 1).

The source driver 1143 may be integrated in another component (e.g., the controller 1112-1). As described above, the controller 1112-1 and the data conversion circuit 1112-2 may include the driving circuit 20 (see, e.g., FIG. 1). For example, the controller 1112-1 and the data conversion circuit 1112-2 may be integrated in a single IC, which includes the configuration of the driving circuit 20.

Functions of an interface conversion circuit and a timing control circuit of the controller 1112-1 may be integrated in the source driver 1143.

The display module 1140 may further include a voltage generation circuit. The voltage generation circuit may output various voltages needed to drive the display panel 1141. In an embodiment, the display panel 1141 may include multiple pixel columns each including multiple pixels.

In an embodiment, the source driver 1143 may convert data included in image data received from the processor 1110 and corresponds to red (R), green (G), and blue (B) to a red data signal (or a data voltage), a green data signal, and a blue data signal, and provide the data signals to multiple pixel columns included in the display panel 1141 during a horizontal period.

The power module 1150 may supply power to the components of the electronic device 1000. The power module 1150 may include a battery and store power voltage. The battery may include a primary cell, which cannot be recharged, a secondary cell or a fuel cell, which are rechargeable, the like, or a combination thereof. The power module 1150 may include a power management integrated circuit (hereinafter, referred to as PMIC). The PMIC may supply optimized power to each of the modules and modules to be described below. The power module 1150 may include a wireless power transceiver electrically connected with the battery. The wireless power transceiver may include multiple coiled antenna radiators.

The electronic device 1000 may further include an embedded module 1160 and an external mounted module 1170. The embedded module 1160 may include a sensor module 1161, an antenna module 1162, and a sound output module 1163. The external mounted module 1170 may include a camera module 1171, a light module 1172, and a communication module 1173.

The sensor module 1161 may sense an input from a body of a user or an input from a pen of the first input module 1131, and generate an electric signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of a user. The fingerprint sensor 1161-1 may include one of an optical fingerprint sensor and a capacitive fingerprint sensor.

The input sensor 1161-2 may generate a data value corresponding to coordinate information of an input from the body of a user or an input from a pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information such as a blood pressure, body fluid, body fat, or the like. For example, in case that a user brings a portion of a body of the user contacting the sensor layer or the sensing panel and remains stationary for a time (e.g., a certain or selectable time), the input sensor 1161-2 may sense a biometric signal, based on a change in electric field by the portion of the body of the user, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. At least one of the fingerprint sensor 1161-1, the input sensor 1161-2, and the digitizer 1161-3 may be disposed on the display panel 1141. One of the fingerprint sensor 1161-1, the input sensor 1161-2, and the digitizer 1161-3, for example, the digitizer 1161-3, may be disposed under the display panel 1141.

At least two of the fingerprint sensor 1161-1, the input sensor 1161-2, and the digitizer 1161-3 may be integrated in a single sensing panel through a same process. In case that at least two of the fingerprint sensor 161-1, the input sensor 161-2, and the digitizer 161-3 are integrated in a single sensing panel, the sensing panel may be disposed between the display panel 1141 and a window disposed on the display panel 1141. In an embodiment, the sensing panel may be disposed on the window, but a position of the sensing panel is not particularly limited.

At least one of the fingerprint sensor 1161-1, the input sensor 1161-2, and the digitizer 1161-3 may be embedded in the display panel 1141. For example, during a process of forming components (e.g., a light emitting element, a transistor, and the like) included in the display panel 1141, at least one of the fingerprint sensor 1161-1, the input sensor 1161-2, and the digitizer 1161-3 may be formed simultaneously with the components.

The sensor module 1161 may generate an electrical signal or data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, an illuminance sensor, or the like.

The antenna module 1162 may include one or more antennas to transmit or receive a signal or power to or from an external device. In an embodiment, the communication module 1173 may transmit a signal to an external electronic device or receive a signal from the external electronic device through an antenna suitable for a communication scheme. An antenna pattern of the antenna module 1162 may be integrated with a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia. record data, or the like, and a receiver, which is used only for phone reception. In an embodiment, the receiver may be integrally or separately formed with a speaker. A sound output pattern of the sound output module 1163 may be integrated in the display module 1140.

The camera module 1171 may capture a static image or a video. In an embodiment, the camera module 1171 may include one or more lenses, an image sensor, an image signal processor, or the like. The camera module 1171 may further include an infrared camera that senses a presence of a user, a position of the user, a line of sight of the user, or the like.

The light module 1172 may provide light. The light module 1172 may include a light emitting diode, a xenon lamp, or the like. The light module 1172 may be operated interlocking with the camera module 1171 or operated independently from the camera module 1171.

The communication module 1173 may form a wire or wireless communication channel between the electronic device 1000 and the external electronic device 2000, and support execution of communication through the formed communication channel. The communication module 1173 may include either or both a wireless communication module such as a cellular communication module, a short-range wireless communication module, a global navigation satellite system (GNSS) communication module, or the like, and a wire communication module such as a local area network (hereinafter, referred to as LAN) communication module, a power line communication module, or the like. The communication module 1173 may communicate with the external electronic device 2000 through a short-range communication network such as Bluetooth, Wi-Fi Direct, infrared data association (IrDA), or the like, or a long-range communication network such as a cellular network, internet, a computer network (e.g., LAN or WAN), or the like. The various types of communication modules 1173 may be implemented as a single chip or may be implemented as respective separate chips.

The input module 1130, the sensor module 1161, the camera module 1171, the like, or a combination thereof, interlocking with the processor 1110, may control the operation of the display module 1140.

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In case that input data is not received from the input module 1130, the processor 1110 may convert an operation mode of the electronic device 1000 to a low-power mode, a sleep mode, or the like, and a power consumption of the electronic device 1000 may reduce.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In case that the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for a presence of a user, a position of the user, a line of sight of the user, or the like from the camera module 1171. The processor 1110 may further execute a luminance correction operation for the image data based on the measurement data. For example, the processor 1110 that has determined whether the user is present through an input from the camera module 1171 may output, to the display module 1140, image data the luminance of which is converted by the data conversion circuit 1112-2 or the gamma correction circuit 1112-3.

Some components among the components may be connected to each other by a communication scheme, e.g., a bus, general purpose input/output (hereinafter, referred to as GPIO), a serial peripheral interface (hereinafter, referred to as SPI), a mobile industry processor interface (hereinafter, referred to as MIPI), a ultra path interconnect (hereinafter, referred to as UPI) link, or the like, which can be used between peripheral devices, and may thus exchange a signal (e.g., a command or data) between the some components. The processor 1110 may communicate with the display module 1140 through an interface (e.g., GPIO, SPI, MIPI, UPI link). For example, one of the communication schemes may be used, and the interface is not limited thereof.

In a driving circuit 20, a display device 10 including the driving circuit 20, and a method of driving the display device 10 in accordance with embodiments of the disclosure, characteristics of first pixels PXo may be sensed during a first sampling time (or a first time) in a first sensing period, and characteristics of second pixels PXe may be sensed during a second sampling time (or a second time). The second sampling time (or the second time) and the first sampling time (or the first time) may be different from each other in a second sensing time. The second sampling time may be set that each second pixel PXe and a corresponding first pixel PXo disposed adjacent to the second pixel PXe have same characteristics. Consequently, a pixel component 14 may display an image with uniform luminance.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A driving circuit comprising:

a sensing component comprising a sensing channel shared by a first sub-sensing line electrically connected to a first pixel and a second sub-sensing line electrically connected to a second pixel; and a timing controller that converts input data supplied from an external device in response to sensing data supplied from the sensing component, and generates output data, wherein the sensing component further comprises:

a sampling line that sequentially receives a first sensing voltage from the first sub-sensing line and a second sensing voltage from the second sub-sensing line; and a sampling switch electrically connected between the sampling line and the first and the second sub-sensing lines, the sampling switch is turned on during a first time the first sensing voltage is supplied to the sampling line, and is turned on during a second time different from the first time the second sensing voltage is supplied to the sampling line, and a duration of the first time is different from a duration of the second time.

2. The driving circuit according to claim 1, wherein the first pixel and the second pixel are positioned on an identical pixel row.

3. The driving circuit according to claim 1, wherein the sensing component further comprises:

a multiplexer electrically connected to the sampling line;

an analog-digital converter that generates first sensing data using the first sensing voltage supplied via the multiplexer, and generates second sensing data using the second sensing voltage supplied via the multiplexer;

a first storage that stores sampling data including information about a turn-on time of the sampling switch corresponding to the second time;

a sensing circuit that controls the turn-on time of the sampling switch according to the sampling data;

a second storage that stores the first sensing data; and a third storage that stores the second sensing data, and the first sensing data and the second sensing data are supplied to the timing controller.

4. The driving circuit according to claim 3, wherein the first storage further stores a minimum offset value and a maximum offset value corresponding to a range of an offset of the second sensing data corresponding to the first sensing data, and the turn-on time of the sampling switch in the sampling data is set to position the offset between the minimum offset value and the maximum offset value.

5. The driving circuit according to claim 4, wherein the offset is set to a value obtained by subtracting the second sensing data from the first sensing data.

6. The driving circuit according to claim 4, wherein the sensing circuit resets the turn-on time of the sampling switch on a cycle to position the offset between the minimum offset value and the maximum offset value.

7. The driving circuit according to claim 1, wherein the sensing channel comprises:

a first channel switch that is electrically connected between the first sub-sensing line and the sampling switch, and turned on during a first sensing period within a sensing period;

a second channel switch that is electrically connected between the second sub-sensing line and the sampling switch, and turned on during a second sensing period within the sensing period;

a first sensing capacitor that is electrically connected to the first sub-sensing line, and stores the first sensing voltage;

a second sensing capacitor that is electrically connected to the second sub-sensing line, and stores the second sensing voltage;

a first capacitor electrically connected between the sampling switch and the sampling line; and a second capacitor electrically connected between a first initialization component that supplies an initialization power voltage and a reference line.

8. The driving circuit according to claim 7, wherein the sensing channel further comprises:

a first switch electrically connected between the sampling switch and the first initialization component; and a second initialization component that is electrically connected between the sampling line and the reference line, and supplies a reference voltage to the sampling line and the reference line.

9. A display device, comprising:

first pixels and second pixels located adjacent to each other on a pixel row in a pixel component;

first sub-sensing lines electrically connected to one of the first pixels;

second sub-sensing lines electrically connected one of to the second pixels;

a sensing component comprising a plurality of sensing channels each of which is shared by one of the first sub-sensing lines and one of the second sub-sensing lines, and generating first sensing data using first sensing voltages from the first sub-sensing lines using an analog-digital converter during a first sensing period, and generating second sensing data using second sensing voltage from the second sub-sensing lines using the analog-digital converter during a second sensing period; and a timing controller that converts input data supplied from an external device using the first sensing data and the second sensing data and generates output data, wherein each of the plurality of sensing channels comprises:

a sampling line electrically connected to the analog-digital converter; and a sampling switch electrically connected to the sampling line, the sampling switch is turned on during a first time the first sensing voltage is supplied to the sampling line, and is turned on during a second time different from the first time the second sensing voltage is supplied to the sampling line, and the sensing component adjusts a duration of the second time utilizing at least one of the first sensing data and the second sensing data.

10. The display device according to claim 9, wherein the first pixels are positioned on an odd-numbered pixel column, and the second pixels are positioned on an even-numbered pixel column.

11. The display device according to claim 9, wherein the sensing component further comprises:

a first storage that stores sampling data including information about a turn-on time of the sampling switch corresponding to the second time, and a minimum offset value and a maximum offset value corresponding to a range of an offset of the second sensing data corresponding to the first sensing data;

a sensing circuit that controls the turn-on time of the sampling switch according to the sampling data;

a second storage that stores the first sensing data; and a third storage that stores the second sensing data.

12. The display device according to claim 11, wherein the sensing circuit resets the sampling data on a cycle, and the sensing circuit stores the sampling data including the turn-on time of the sampling switch in case that the offset obtained by subtracting the second sensing data from the first sensing data generated from an identical one of the plurality of sensing channels is positioned between the minimum offset value and the maximum offset value in the first storage.

13. The display device according to claim 12, wherein the sampling data corresponds to an average of the sampling data of the plurality of sensing channels.

14. The display device according to claim 12, wherein the pixel component includes a plurality of pixel rows, and the sampling data corresponds to an average of the sampling data of the plurality of sensing channels of at least two of the plurality of pixel rows.

15. The display device according to claim 12, wherein the sampling data corresponds to pieces of the sampling data corresponding to the plurality of sensing channels.

16. The display device according to claim 15, wherein the sampling switch in each of the plurality of sensing channels is set to a turn-on state during different times by the pieces of the sampling data.

17. The display device according to claim 9, wherein the sensing component further comprises a multiplexer that sequentially electrically connects each of the plurality of sensing channels to the analog-digital converter.

18. A method of driving a display device including a plurality of sensing channels electrically connected to one of first sub-sensing lines electrically connected to first pixels, and to one of second sub-sensing lines electrically connected to second pixels, the method comprising:

receiving sampling data corresponding to one or more turn-on times of a sampling switch;

turning on the sampling switch included in the plurality of sensing channels for a first duration during a first sensing period in a sensing period, and supplying a first sensing voltage to a first capacitor;

determining a second duration utilizing the sampling data;

turning on the sampling switch for the second duration during a second sensing period different from the first sensing period, and supplying a second sensing voltage to a second capacitor;

generating first sensing data using the first sensing voltage; and generating second sensing data using the second sensing voltage.

19. The method according to claim 18, further comprising:

storing a minimum offset value and a maximum offset value corresponding to a characteristic deviation range between the first sensing data and the second sensing data; and storing the sampling data including a turn-on time of the sampling switch set to position an offset obtained by subtracting the second sensing data from the first sensing data between the minimum offset value and the maximum offset value.

20. The display device according to claim 19, wherein the sampling data corresponds to an average of pieces of the sampling data of the plurality of sensing channels.

* * * * *